United States Patent
Shah et al.

(10) Patent No.: US 11,636,484 B2
(45) Date of Patent: Apr. 25, 2023

(54) SYSTEMS AND METHODS FOR CASH ACCESS TO EARNED BUT UNPAID INCOME

(71) Applicant: PAYACTIV, INC., San Jose, CA (US)

(72) Inventors: Safwan Shah, Saratoga, CA (US); Sohail Aslam, Milpitas, CA (US); Ijaz Anwar, San Jose, CA (US)

(73) Assignee: PAYACTIV, INC., San Jose, CA (US)

( * ) Notice: Subject to any disclaimer, the term of this patent is extended or adjusted under 35 U.S.C. 154(b) by 1016 days.

(21) Appl. No.: 16/394,807

(22) Filed: Apr. 25, 2019

(65) Prior Publication Data

US 2019/0251564 A1 Aug. 15, 2019

Related U.S. Application Data

(63) Continuation of application No. 15/256,746, filed on Sep. 6, 2016, now Pat. No. 10,318,956, which is a continuation-in-part of application No. 14/849,851, filed on Sep. 10, 2015, now abandoned.

(60) Provisional application No. 62/268,501, filed on Dec. 17, 2015, provisional application No. 62/253,150, filed on Nov. 10, 2015, provisional application No. (Continued)

(51) Int. Cl.
G06Q 40/00 (2023.01)
G06Q 20/32 (2012.01)
G06Q 20/36 (2012.01)
G06Q 20/40 (2012.01)
G06Q 10/105 (2023.01)
G06Q 40/03 (2023.01)
G06Q 40/12 (2023.01)

(52) U.S. Cl.
CPC ....... *G06Q 20/4015* (2020.05); *G06Q 10/105* (2013.01); *G06Q 20/3223* (2013.01); *G06Q 20/3674* (2013.01); *G06Q 40/03* (2023.01); *G06Q 40/125* (2013.12)

(58) Field of Classification Search
CPC .......... G06Q 20/3223; G06Q 20/3674; G06Q 40/025
See application file for complete search history.

(56) References Cited

U.S. PATENT DOCUMENTS 8,990,389 B2 * 3/2015 Rowe ...................... H04L 63/10
709/224
9,202,250 B1 * 12/2015 Palaniappan ........ G06Q 40/125
(Continued)

*Primary Examiner* — Jessica Lemieux
(74) *Attorney, Agent, or Firm* — Vantra Patents LLC; Anand P Narayan

(57) ABSTRACT

Systems and methods of providing access to earned but unpaid income are provided. An available balance of earned but unpaid income is computed. A login request and device information may be received from a remote device and a login procedure is invoked based on an assessed security level of the login device type. On authenticating the remote device successfully, the available balance of earned but unpaid income is recomputed. A list of financial services is displayed to the user, and a request may be received from the remote device for access to earned but unpaid income specifying cash access, an amount and a deduction schedule. Terms and conditions of a transaction, including a fee are displayed and a signal indicating acceptance is received. The request is fulfilled, cash dispensed, and a deduction file associated with an employer of the user is updated.

20 Claims, 17 Drawing Sheets

Related U.S. Application Data

62/238,622, filed on Oct. 7, 2015, provisional application No. 62/214,179, filed on Sep. 3, 2015, provisional application No. 62/053,658, filed on Sep. 22, 2014.

(56) References Cited

U.S. PATENT DOCUMENTS

| | | | |
|---|---|---|---|
| 9,544,272 B2* | 1/2017 | Alperovitch | H04L 51/212 |
| 11,354,637 B2* | 6/2022 | Ramachandran | G06Q 20/385 |
| 2004/0243515 A1* | 12/2004 | Kurihara | G06Q 20/04 |
| | | | 705/41 |
| 2011/0246316 A1* | 10/2011 | Cincera | G06Q 20/204 |
| | | | 705/17 |
| 2013/0124410 A1* | 5/2013 | Kay | G07F 19/211 |
| | | | 705/43 |
| 2013/0226799 A1* | 8/2013 | Raj | G06Q 20/401 |
| | | | 705/44 |

* cited by examiner

SYSTEMS AND METHODS FOR CASH ACCESS TO EARNED BUT UNPAID INCOME

CROSS-REFERENCES TO RELATED APPLICATIONS

This application is a continuation of U.S. patent application Ser. No. 15/256,746 filed 6 Sep. 2016, which is a continuation in part of, and claims the benefit of U.S. patent application Ser. No. 14/849,851 filed 10 Sep. 2015, which claims the benefit of U.S. Provisional Patent Application No. 62/053,658 filed 22 Sep. 2014. U.S. patent application Ser. No. 15/256,746 also claims the benefit of U.S. Provisional Patent Application No. 62/214,179 filed 3 Sep. 2015, U.S. Provisional Patent Application No. 62/238,922 filed 7 Oct. 2015, U.S. Provisional Patent Application No. 62/253,150 filed 10 Nov. 2015, and U.S. Provisional Patent Application No. 62/268,501 filed 17 Dec. 2015. The specifications of all of the above referenced applications are herein incorporated by reference herein in their entirety.

FIELD

The present disclosure relates generally to the provision of financial services, and more specifically, to methods and systems for the provision of access to earned but unpaid income that has accrued, but not been paid, to workers.

BACKGROUND

According to the Federal Deposit Insurance Commission, over 90 million individuals in the United States are financially underserved. Up to 75% of the working population survives paycheck to paycheck with little to no savings. Credit is generally restricted, but for the underserved, credit is either non-existent or very expensive. The current banking system is generally not equipped to serve low to moderate income consumers, leaving them without many viable choices when making financial adjustments in the absence of credit and savings. Therefore, the underserved population accesses over $790 billion in alternative financial services (AFS) such as bill pay, check cashing, and remittance from non-bank sources. Fees for AFS cost the underserved about $129 billion annually. In addition, another $100 billion is accessed as payday loans annually. A typical payday loan is $400 with an APR in the range of 600%.

The underserved population continues to grow year after year due to financial regulations and macroeconomic conditions. The latest figures reveal that 40% of households earning less than $50 k are underserved, and additionally that even 19% of households earning between $50 k and $75 k and 14% of households earning over $75 k are also underserved. According to publically available research, within the U.S., the underserved collectively represent $1 trillion in annual spending with less than 10% market penetration. Global trends of the underserved, when compared to the U.S., represent an opportunity of a much larger magnitude.

There is a need, therefore, for scaleable systems and methods that can serve this underserved population.

SUMMARY

In one set of illustrative embodiments, a method of providing access to earned but unpaid income may include computing at a pre-determined frequency an available balance of earned but unpaid income for a user, receiving, at an authentication server, a login request and device information from a remote device, processing the device information to determine a login device type and geolocation of the user, invoking a login procedure based in part on an assessed security level of the login device type, authenticating a response to the invoked login procedure received from the remote device to indicate either a successful login or an unsuccessful login, re-computing the available balance of earned but unpaid income upon a successful login, displaying, at the remote device, a screen depicting a list of financial services to the user, receiving a request, from the remote device, for access to earned but unpaid income, where the request may include one or more financial services selected from the list of financial services, an amount of requested funds and a deduction schedule, displaying at the remote device a screen listing terms and conditions of a transaction to provide the selected financial service, where the terms and conditions may include a fee chargeable for the transaction, receiving a signal from the remote device indicating acceptance by the user of the terms and conditions of the transaction, and fulfilling the request if the amount of requested funds is less than or equal to the recomputed available balance of earned but unpaid income, where fulfilling the request may include transferring a value of funds to a target account associated with a requested financial service; and updating either a deduction file or a deduction record associated with an employer of the user with the amount of requested funds the deduction schedule, and the fee chargeable for the transaction.

According to a second set of illustrative embodiments, a method for providing cash access to earned but unpaid income may include computing at a pre-determined frequency an available balance of earned but unpaid income for a user, receiving, at an authentication server, a login request and device information from a remote device, processing the device information to determine a login device type and geolocation of the user, invoking a login procedure based at least partly on an assessed security level of the login device type, processing a response to the invoked login procedure received from the remote device to cause a successful login, re-computing the available balance of earned but unpaid income upon the successful login, displaying, at the remote device, a screen depicting a list of financial services to the user, receiving a request, from the remote device, for access to earned but unpaid income, the request comprising a request for cash access, an amount of requested funds and a deduction schedule, preparing a listing of a multiple cash access points based on the received device information, displaying, on a screen at the remote device, the listing of multiple access points, displaying at the remote device a screen listing terms and conditions of a transaction to provide the cash access, receiving at least one signal from the remote device indicating acceptance by the user of the terms and conditions of the transaction, sending a code to a registered telephone number associated with the user and dispensing cash corresponding to the amount of requested funds at one of the multiple cash points in response to an entry of the code at one of the multiple cash access points.

According to a third set of illustrative embodiments, a system for providing access to earned but unpaid income to a user may include a bastion server to access one or more external servers that restricts intruders, an authentication processor for receiving a request for access from a remote device, a load balancer server coupled to a plurality of façade servers that generates an interface tailored to the remote device, a database server configured to store a multiple elements of encrypted user data, a rules engine server coupled to the database server and configured to store multiple rules governing access to earned but unpaid income, and a transaction processing server that is coupled to the database server and the rules engine server and configured to receive a request comprising a selection of a financial service, an amount of requested funds and a deduction schedule, and to determine whether the selection complies with the rules governing access to earned but unpaid income.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

The present disclosure relates to methods and systems for performing financial transactions and in at least some embodiments relates to such methods and systems that involve the establishment and operation of a financial services network, by way of an intermediary or "third party" that interacts with employers and their employees, with regard to the earned but unpaid (EBU) wages/income of the employees. In some embodiments, users are able to obtain a form of decoupled debit that is linked to their own accrued wages/income, and offers a way to increase the velocity of money in the system. The earned but unpaid wages/income arise because employers process payroll weekly, bi-weekly, bi-monthly, or monthly for income that is already earned by an employee prior to payday. That is, most employers typically withhold wages/income for a certain period of time even after dispersing wages/income for earned income. For example, an employer that processes payroll on a bi-weekly basis and pays wages/income for two weeks worked at the end of third week. In this example, depending on the day under consideration, an employee can have earned but unpaid income between 1 to 21 days.

In at least some such embodiments, member users are able to instantly access financial services such as check cashing, bill pay, remittance, savings, prepaid long distance minutes, prepaid cellular top-up, open and closed loop prepaid cards, payroll cards, secured and unsecured credit cards, budgeting tools, credit counseling, auto financing, and other relevant products, services, offers and discounts. Further, in at least some embodiments, the network is designed to offer its members (particularly employee members) products and services based on the employee's employment status and income. Additionally, in least some embodiments, employment is generally a pre-requisite to access the membership program, and the membership program is offered by the third party to employees by way of their employers (that is, it is by virtue of the employer's participation in the network that the network becomes accessible and usable by the employer's employees). Also, in at least some such embodiments, the third party acts as a benefit administrator and a payment and payroll processor between the employer and the employee.

Figure 1A:
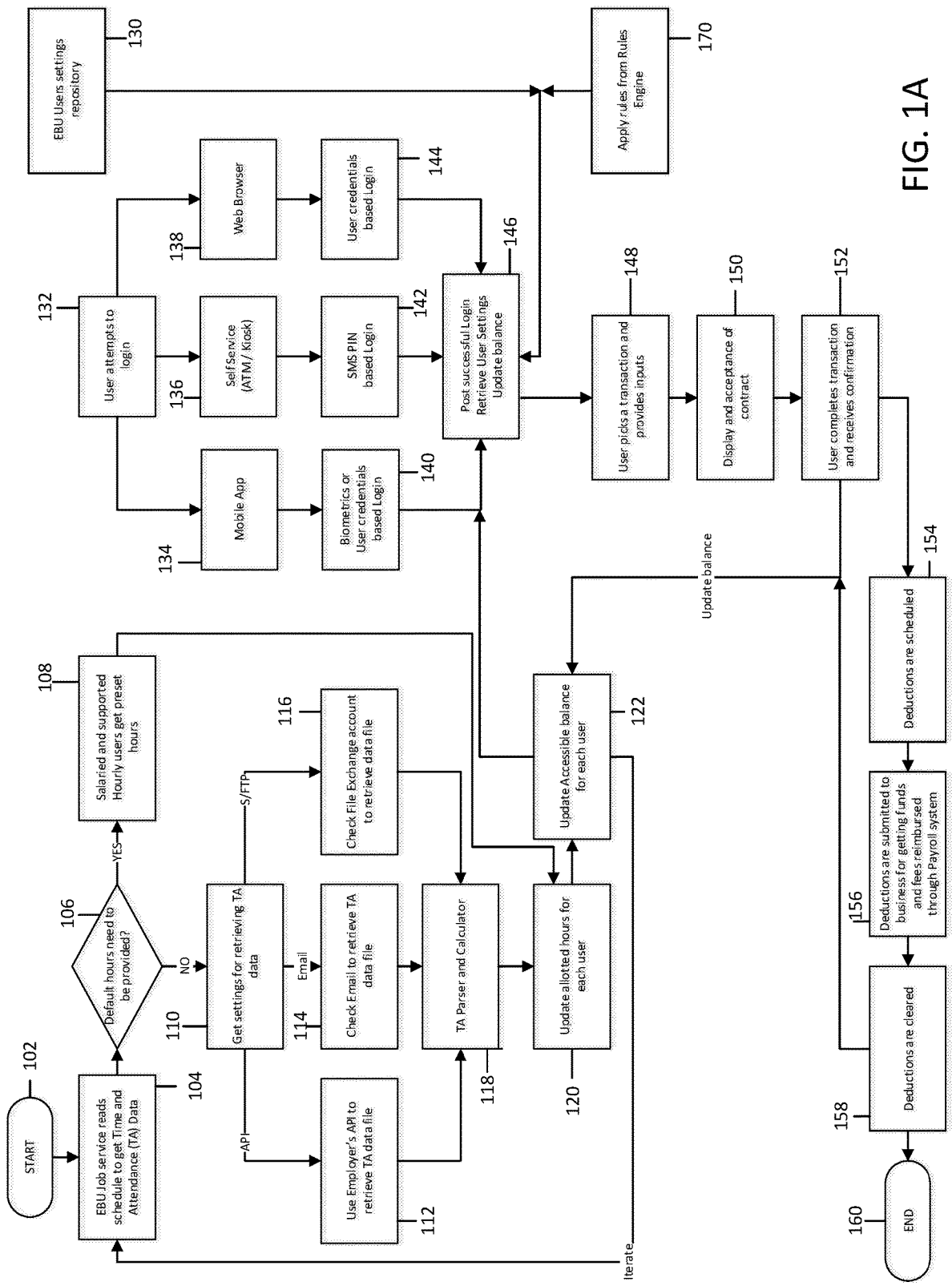
FIG. 1A is a flowchart of a method to access earned but unpaid income as taught by a preferred embodiment of the invention.

Referring to FIG. 1A, a flowchart shows a workflow by which employers and employees can interact directly or indirectly with the network or system to utilize one or more services generally offered. The workflow commences at step 102, and a scheduled job service executes at step 104 to obtain Time and Attendance (TA) data for employee users across the employers who are participating in the network. The scheduled job service may execute at any predetermined time, though in a preferred embodiment, it is scheduled to run nightly, or at times when the computing load on the system is expected to be low. In some embodiments, the same third party may offer a solution to employers where Time and Attendance (TA) data is generated from timesheets and similar records, in which case this job service becomes a largely internal processing arrangement. A check is made at step 106 as to whether a default number of hours need to be assigned for the case, because of pre-defined settings in which case all salaried and supported hourly workers are assigned preset hours at step 108. This may occur in situations where the agreement between the service provider and a given employer provides for that option. In such an option, there may be no updates from the employer about actual employee hours worked, but information about discontinued employment may be provided, and the workflow operates on an assumed schedule of the employee/worker. In other cases, the system obtains settings for retrieving the Time and Attendance data for the given employer at step 110, and then proceeds along the workflow using the method prescribed for the employer/customer.

Time and attendance data may be received in a variety of formats. Non-limiting types of supported formats in an exemplary embodiment include JSON, XML, CSV, Excel, Text, or PDF, and the data-files or data-records may be received via secured FTP, email, or Sharepoint.

Some employers may exchange data using Application Programming Interfaces (API). For those employers exchanging data using APIs, the respective employer API is used to retrieve the data file or data records at step 112; for employers that are exchanging TA data via email, an assigned email address storage location is checked for the TA data file at step 114; and for employers using a File Exchange method, the File exchange account is checked for TA data at step 116. In the event that the file is not present, the event log is updated suitably to that effect, and the schedule is updated to run the process again at a later time during the schedule. The workflow may attempt to retry the data transfer a certain number of times before flagging a failure and an alert to the system. The TA Parser and calculator parses the received data file(s) at step 118, and then updates the allotted hours for each user at step 120, and the accessible balance for each user at step 122. The accessible balance is calculated by taking the static data i.e. hours worked (Regular, Over Time, Double overtime, Paid-time-off) and then multiplying with the rate. This continues until all updates for all employers are completed. This subprocess of the workflow ensures that updated data for each employee user from each enroller employer or customer is available.

User access begins with an attempt to access the system at step 132. A load balancer server and one or more Façade servers generate an interface tailored to the remote device attempting to access the system.

This access may be made via a variety of methods; as an example, an attempt to access is shown in this embodiment via a Mobile Software Application (App) 134 running on a mobile device, a self-service ATM/Kiosk 136, or via a Web Browser 138. Employees may interact with the system by way of mobile device(s) or desktop (or laptop) computers (e.g., web solution-equipped computers or computerized devices) of the employees, which can serve as the employee access device. Other user access system(s) can also take any of a variety of forms including, for example, kiosks, which in some embodiments are located at the facilities of the employers at which the employees work and/or at other suitable or convenient locations or, further for example, retail point-of-sale (POS) systems, which in some embodiments are located at stores or retail outlets or at other suitable or convenient locations. In some embodiments, the user access system(s) are merely systems that allow for accessing or communicating with the third party computer system. Also, depending upon the embodiment, the user access system(s) can be self-service system(s) (e.g., that are operated or controlled by users in a self-service manner) or can be assisted service system(s) (e.g., where assistance can be provided from another source, such as from the third party).

The system server can detect an attempt to access as well as the nature of the device being used in the attempt. In response to the access attempt, based on the detected device, an appropriate login sequence and procedure is offered to the user by the system. For a Mobile App, a biometric or user credential based login sequence 140 is used. For an ATM, a kiosk, or a device emulating such operation, in most cases an SMS/PIN based login 142 is used where an alphanumeric code of a pre-determined length is generated for the requested access transaction and sent using a messaging system, and for a web-browser based access, a user credential based login sequence 144 is used. In some exceptional cases, some kiosks may also use a user credential based login system, for example, if a mobile phone is not allowed at a site on which the kiosk is located. Additional details regarding the login sequences are described later in this specification.

After a successful login, the system updates the user settings including a balance available to the user using the EBU user settings 130.

At the time of the login, the system checks if any previously scheduled automatic transactions such as Savings Deposits or Bill payments have taken place in which case those amounts need to be deducted from the accessible amount computed previously during the scheduled update of the accessible balance for each user.

The user picks a transaction of interest at step 148, and provides details of the proposed transaction. More particularly, the user indicates a selection of an available financial service from among several available financial services. In an exemplary non-limiting embodiment, the available services may include cash access service by which an employee/user can get cash, a bank deposit (ACH) service, a pay bills service, a money remittance service, and a savings service. Other services offered may include ACH into DDA (Direct Deposit Advance), Wire (Wire Transfer), Debit Card Load, Prepaid Card Load, eWallets Load, Mobile wallets, and POS (Point-of-Sale) pick-up (e.g., at a retail store or a coffee shop).

Rules from a Rules Engine 170 are then applied. In practice, processing involving application of a rules engine can be performed directly and/or be integrated within a cloud-based platform. Regardless of the particular computer system or systems performing such processing, application of the rules engine can involve processing that involves application of a series of configurable rules that are checked on per state, per employer, per employee, per transaction, and per interaction level, and the rules can be applied every time an employee logs in to the system Thus, an amount of an EBU access, associated repayment term and cost, and other features or characteristics of the access can be impacted by rules applied through the rules engine.

Among the factors that can be considered by the third party in implementing the cash advance process are employer-level risk controls for the third party's program, which in at least some embodiments or circumstances can include one or more of the following:

Employer's financial condition—going concern determination

Industry

Employee state of residency

Number of employees under a certain income range that are the ideal candidates for the program Employee turnover ratio Seasonality of goods and services produced and or offered Price volatility of goods and services produced and or offered Whether payroll is processed weekly, bi-weekly, bi-monthly, or monthly Whether the employer withholds wages or income as a normal practice Time management system used by the employer Number of employees on direct deposit vs. payroll checks Number of employees working at physical locations It should be appreciated that these types of rules can also be employed the third party in implementing access to EBU and other features and services of the system/network more generally, and application of a rules engine taking into account these and/or other rules is not limited merely to the context of implementing the cash access process. For example, an employer can be assigned to a program based on risk rules as part of the underwriting process. Also, it should be appreciated that, in at least some embodiments or circumstances, a single employer can have more than one program within a company for different categories of employees. Indeed, the third party can employ or take into account multiple different sets of rules in implementing the cash access service and/or other features or services associated with the system, where the different sets of rules apply to different employees that are all employed by the same employer.

Additionally, there also exist employee-level risk controls for his or access, which in at least some embodiments or circumstances can include one or more of the following:

Employee state of residency

Employee income

Employee position

Employee status

Hours worked by the employee

Days worked and or not worked consecutively vs. non-consecutively by employee

Day of the week advanced is requested by an employee in relation to work week ending for payroll processing How frequently employee accesses the advance A current date An hourly rate or salary of the employee A currency multiple dispensed at a kiosk A number of repayments promised How many pay periods does an employee take to repay the advance How much of an advance employee accesses in comparison to total amount available Acceleration of outstanding balance if employee has not worked for certain number of days within a pay period—consecutively or non-consecutively Employee tenure factor. Percent of earned but unpaid income available to an employee is also determined by tenure of an employee with an employer. For every year of employee's employment with an employer, the third party increases the percent (configurable) of net earned and unpaid income available to an employee. For example, an employee with employment history of 2 years has 40% net earned but unpaid income available. An employee with 5 years of employment history will have 43% (5−2=3/40%+3%=43%) of net earned but unpaid income available.

Further, various additional rules can be applied by third party (and the third party computer system(s)) in implementing the cash access service (which rules can be applied generally with respect to or under an entire program and/or with respect to an individual employee), including for example:

Whether the state law allows such access

Amount of an access permitted by state law

Whether the state law allows payroll deductions for repayment of accessed funds

Number of maximum deductions allowed by state law

Maximum amount of deduction allowed by state law

Whether state law allows acceleration of outstanding balance

Whether state law requires spousal consent for payroll deductions

Maximum number of payments

Maximum % of net income accessible

Currency multiple dispensed at the kiosk

Maximum withdrawal amount

Minimum withdrawal amount

Maximum amount per month

Allowed number of concurrent wage/income accesses

Minimum working hours required

Minimum employment duration in months

Minimum working days in a week

Cash access buffer days

Partial deductions (minimum %)

Deferred payment with fee or without fee

Charge deferred fee with next deduction

Non-payroll payment with fee or without fee

Charge non-payroll payment fee with next deduction

Deferred payment count restriction—configurable

Maximum number of deferred payments

Transaction expiration hours

Minimum deduction amount

Access percentage In buffer Days

Skip first installment

First deduction deferral

Minimum deduction count for payment deferral

Offer subscription

Disable defer payment before days

Again, such rules may be applied not only with respect to implementation of the cash access service but also with respect to the implementation of the system more generally and other services provided by the EBU system.

Although the above-discussed rules are examples of rules that can be considered by the third party in implementing the cash access service, there are numerous other rules, factors, and/or other considerations that can also be taken into account as well. Among other things, a variety of considerations can be taken into account that can result in additional types of funds access to be provided, and/or associated limits being set. For example, in at least some embodiments, once every quarter, semiannually or annually (configurable) the third party can facilitate funds access with a materially larger limit. This may also contain components of unearned income and earned but unpaid income. The threshold for the amount based on earned but unpaid income may go up to or higher than 100% of net earned but unpaid income.

Additionally, in at least some embodiments, the third party (and the rules engine at 170) can take into account one or more considerations regarding possibly interplaying between the cash access service and one or more other services provided. For example, the amount and term permitted can be different (configurable) if proceeds are directly used to pay bills through the third party's billpay service versus taking cash. Also for example, the amount and term permitted can vary (configurable) depending on the type and amount of bill being paid through the third party's billpay service versus taking the cash. Further for example, the amount and term permitted can be different (configurable) if proceeds are directly used to remit funds (money transfer) through the third party's platform (billpay service) versus taking cash. Additionally, for example, the amount and term permitted can vary (configurable) depending on the amount of remittance and the location (national versus international) where the funds are remitted through the third party's platform versus taking cash. Also for example, the amount and term permitted for a can vary (configurable) depending on who receives the remittance through the third party's platform versus taking cash. Further for example, the amount and term permitted for a can vary (configurable) depending on whether the funds remitted are sent to individuals that are members of the cash access network or not.

Further for example, the amount and term permitted can be different (configurable) if proceeds are directly used to pay for the type and amount of personal, business, government (municipal, state, and federal), money orders, cashier checks, demand drafts, and foreign check cashing fee for checks cashed through the third party's platform. Also for example, the amount and term permitted can be different (configurable) if proceeds are directly used to purchase long distance minutes through the third party's platform versus taking cash. Additionally, for example, the amount and term permitted can be different (configurable) if proceeds are directly used to purchase and or top up prepaid cellular through the third party platform versus taking cash. Also for example, the amount and term permitted for can be different (configurable) if proceeds are directly used to pay for goods and services from merchants where the third party has provided offers and discounts to employees. Further for example, the amount and term permitted can vary (configurable) depending on the type of merchant is being paid through the third party's offers and discounts versus taking cash. Types or merchant categories include brick and mortar versus ecommerce retailers or products versus services that are offered. Also for example, the amount and term permitted may vary (configurable) depending on the type of goods and services purchased from a merchant through the third party's offers and discounts versus taking cash.

Additionally, the amount and term permitted can vary (configurable) if proceeds are accessed as cash through an ATM (automated teller machine), kiosk, picked up from a retail POS (point-of-sale) integrated merchant, ACH (automated clearing house) into the employee or another person's/persons DDA (direct deposit advance) (P2P—person to person), loaded on employee's prepaid card or another person's/persons prepaid card, loaded on employee's payroll card, loaded on employee's debit card or another person's/persons debit card, loaded on employee's eWallet or another person's/persons eWallet, or loaded on employee mobile wallet or another person's/persons mobile wallet. Also, employee usage behavior and other factors can also be considered.

Once the transaction is approved after step 148, the process advances to the step 150 at which time the system intercommunicates with the employee (again via the employee's operation of the remote device or employee computer system or other user access system) so as to request that the employee consent to terms and conditions pertaining to the access to earned but unpaid income. This may be achieved via a display on a screen or a voice readout. The system then determines whether a signal provided by the employee/user (via a signature, an air-signature, an on-screen signature, or a voice affirmation) indicates that the employee agrees to the terms and conditions pertaining to the access to earned but unpaid income. If not, the process ends at the step 160 and no access to EBU is allowed.

These intercommunications can involve providing terms and conditions from the third party computer system for receipt by the employee device or other user access system and receiving signals from the employee device or other user access system indicating the employee's acceptance of those terms and conditions. Also, these intercommunications can involve providing transactions confirmations or other transactions-related information from the third party computer system for receipt by the employee device or other user access system (and/or receiving signals from the employee computer system or other user access system relating to transactions). Also, the step 150 can involve the receipt, at the third party computer system, of information being submitted by an employee, as well as the processing and saving to a database of such submitted information or other information received at the third party computer system.

Once the user accepts the conditions at step 150 in response to a display of a contract governing the transaction, the user then completes the transaction at step 152. The deductions are then scheduled at step 154. In at least some embodiments the user/employee can repay the amount accessed all at one time through one payroll deduction or over an extended period of time (configurable) through multiple payroll deductions. The duration of the repayment term can be dependent on the payroll pay period. The payroll pay period can be weekly, bi-weekly, bi-monthly, or monthly, or in another conventional manner of conducting payroll operations or making payments to employees. Also for example, with respect to the fees charged for the service, in at least some embodiments the third party can charge a fixed fee per deduction regardless of the amount accessed by an employee. For example, a fee of $15 may be charged for a $500 access with 3 deductions @ $5 per deduction. This amount will be repaid over 3 pay periods. Pay periods can be weekly, bi-weekly, bi-monthly, or monthly. Similarly, a fee of $5 may be charged for a $500 access with 1 deduction @ $5 per deduction. This amount will be repaid over 1 pay period. In a preferable embodiment, the employer is not billed, and there are no upfront fees charged to either employer or employee. While repayment of the amount provided is primarily obtained from employee's net pay which is calculated by deducting taxes and all other statutory deductions from gross pay, under some circumstances employees may exercise an option to repay the amount directly to the third party as an alternative to payroll deductions. In some embodiments, employees can also repay the amount through ACH, credit card or debit card in one or multiple payments. Also, in at least some embodiments, employees can accelerate repayment term without penalty, and/or employees can also request to skip payment.

Based on a pre-determined schedule, the deduction data is submitted to the employer at step 156, after which the deductions are cleared at step 158. Deduction clearance refers to steps by which the repayments are processed by the overall system, particularly by way of the EBU system/third party computer system(s) and interactions between those system(s) and other system(s) such as employer computer system(s). Examples include:

1) A deduction file is generated by the third party system based upon the total amount due back from users of the system associated with the employer including any associated fees.
2) The deduction file is sent to the employer by the third party based upon employer payroll processing frequency and associated deadlines via FTP, web service, email, or other file transfer mechanisms.

3) Payroll Deduction
   Employer can manually deduct from employee's payroll through data entry.
   Employer can import the deduction file into payroll system.
   The third party can integrate into the payroll system and upload the file for the employer.
4) Employer's payroll processor deducts and pays the deducted amount to the third party by check or ACH.
5) If the employer processes payroll internally then payment is made directly by the employer to the third party by check or through ACH.
6) If the EBU system is also providing payroll services, the payment is internally adjusted within the system by transferring the amount directly to the third party's account.

It should be appreciated that such steps related to the repayment of access to EBU can be generally considered as being encompassed by the step 158 of FIG. 1A, according to which the third party computer system(s) interact with the employer computer system(s) so that the records at the employer computer system(s) reflect employee accessing/usage of the EBU access services.

The transactional workflow terminates at step 160.

Figure 1B:
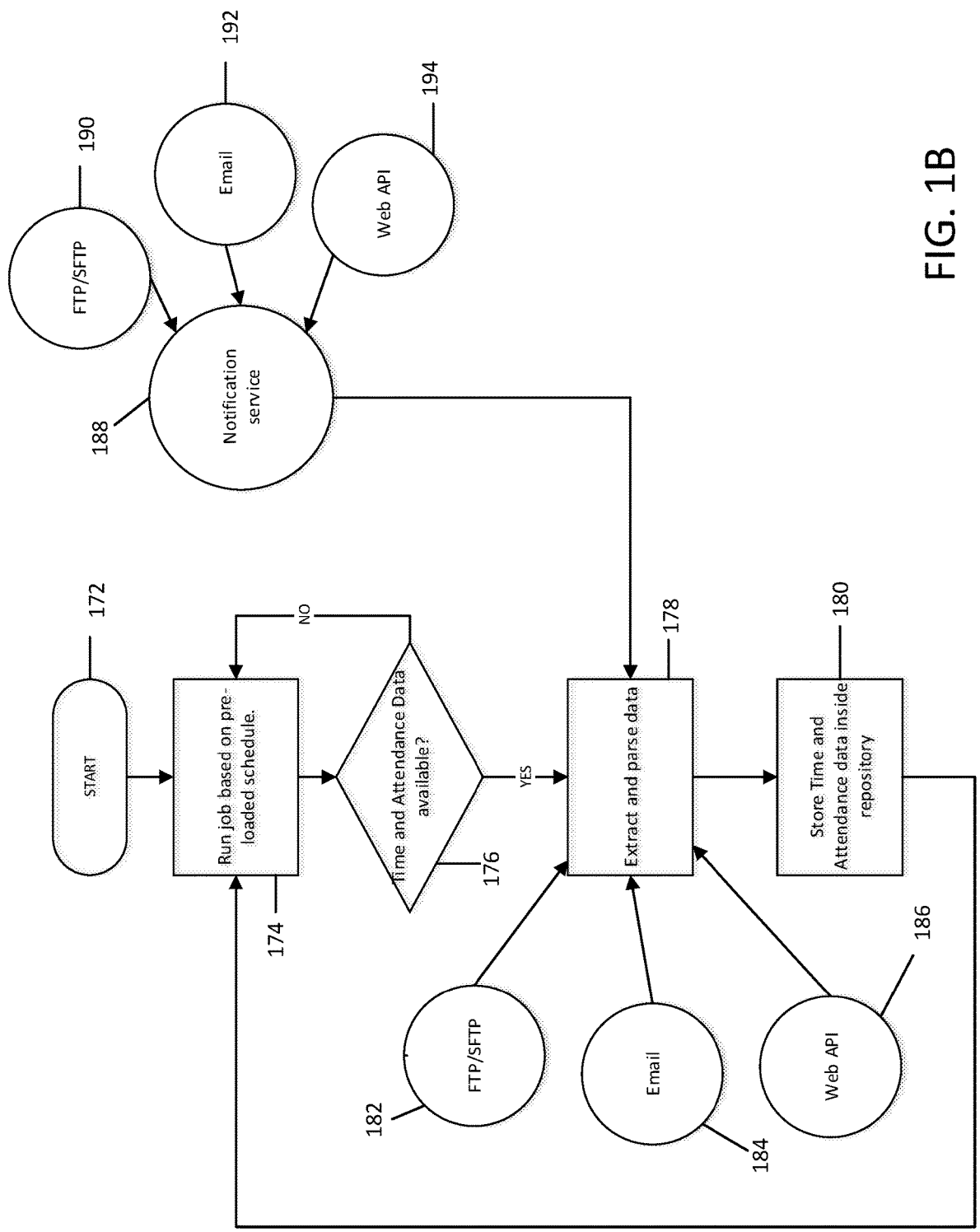
FIG. 1B is a flowchart of a job service implemented in a preferred embodiment of the invention.

FIG. 1B depicts the process by which the job service operates. The job service may utilize both pull and push methods. A pull based method is used for each business that requires time and attendance data to be extracted at a certain schedule. The system feeds that schedule inside its scheduler and then pulls data accordingly. The data pulling can leverage on API usage, FTP/SFTP, or email. If a business has no specific schedule, a push based method may be used where an alert mechanism is defined such that a notification is received when a file is dropped at an FTP/SFTP or Email account. The workflow runs the job service based on a pre-loaded schedule for each employer enrolled or registered in the service at step 174, by interfacing directly or indirectly with the employer's time management system or data. If Time and Attendance Data is available at the pre-planned location at step 176, the job service causes the extraction and parsing of the data at step 178, and the data is stored in the designated repository at step 180. Depending on the method in which the data files are expected to be received, the job service uses either an FTP/SFTP service 182, an Email service 184, or a Web API 186. Data from certain sources may not be received as per as a schedule but may be pushed into the system by the employer or provider of this data at their convenience. For such sources of data, a notification service 188 also runs in the background, checking an FTP/SFTP service 190, an Email service 192, or a Web API service 194 at regular intervals for any incoming data. On receipt of data and a notification, the job service causes the extraction and parsing of the data at step 178. The Time and Attendance data refers to a broad variety of data including clock-in times, clock-out times, personal time off, sick days, lot based output data, hours worked, and so on. It also refers to data such as termination files sent by employers, wherein a file may be received based on a schedule or on a push basis—all terminated employees' data is read and marked as deactivated. Specific formats may be applied to data records and files from each employer based on the previous agreement.

Thus, the third party computer system(s) can access and monitor employee hours (worked time) data as made available by the employer computer system(s) and process that data (and possibly other data as well). More particularly, in at least some embodiments, for hourly (non-exempt) employees, the third party can interface with (or integrate into) the employer's time management system to determine the hours employees have worked but have not been paid for. Also, in some embodiments, for hourly employees, the third party can access (if permitted) time management data real time on each instance a cash access is requested. Under the real time process the third party can disperse an amount based on earned but unpaid wages/income up to the time employee has worked but has not been paid. For employees who are paid based on work output (lot based payment) rather than time, the third party may obtain access to the work output data rather than time data. Alternatively, in at least some other embodiments, the third party can instead (or also) use a batch process to access time management data. Under the batch process, the third party can disperse an amount based on earned but unpaid wages up to the time employee has worked but had not been paid from the information (data) retrieved from the batch file. A given time management batch can contain information only for a day or may be cumulative data for a period of time. Further, for salaried (exempt) employees, the third party may assume that the employees work full time. The third party can rely on the employer to inform the third party if the employee has stopped working or has taken unpaid leave. After gaining access to employee data, the third party can store such data in a secure manner in memory associated with the third party computer system(s) or in another location, such as in the cloud. When a transaction requires authorization by the third party, appropriate time management data is accessed from the memory or cloud versus (instead of) the employer computer system(s) 130.

Figure 2A:
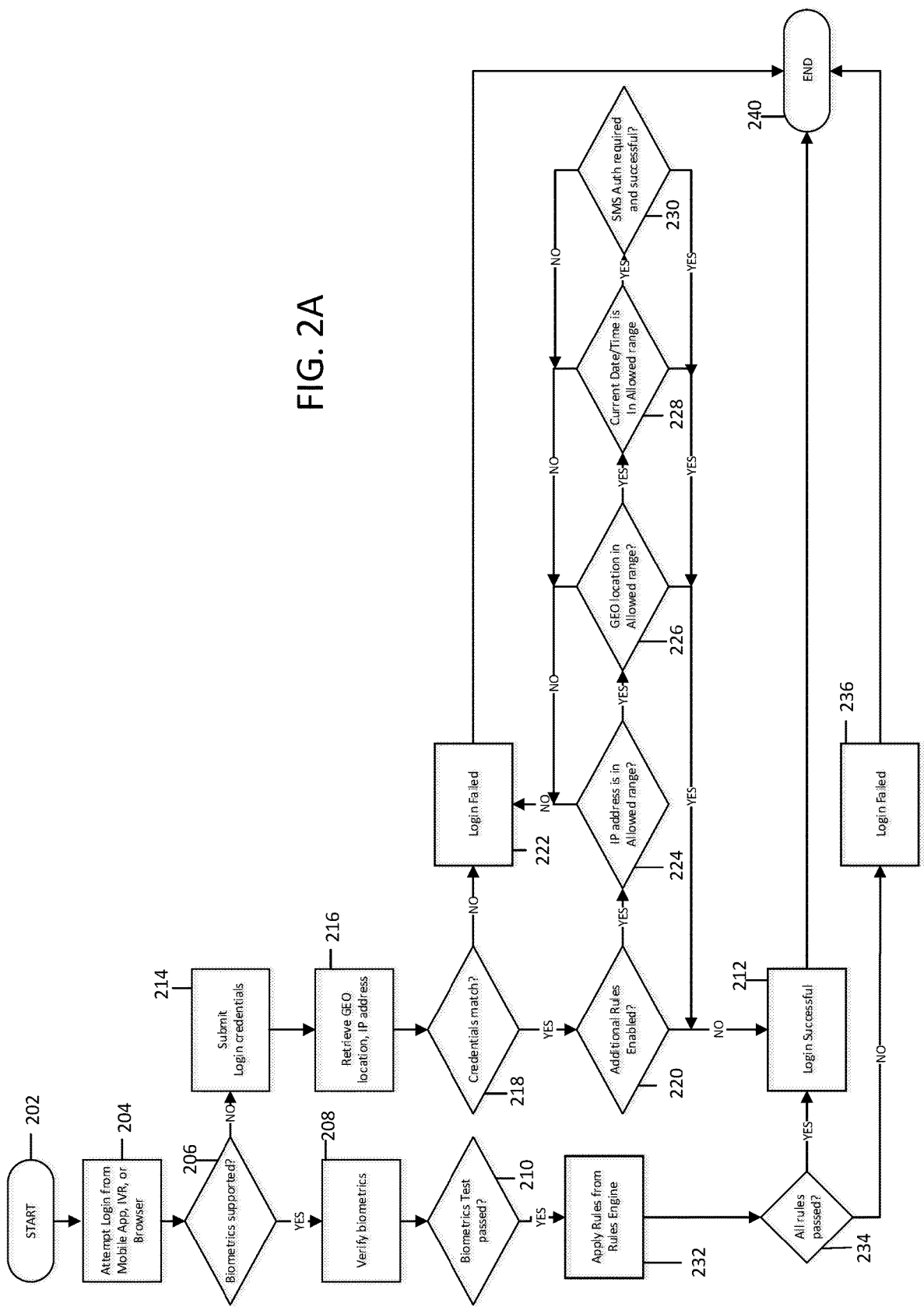
FIG. 2A is a flowchart that illustrates further details of an exemplary login and authentication process followed in the method depicted in FIG. 1.
Figure 2B:
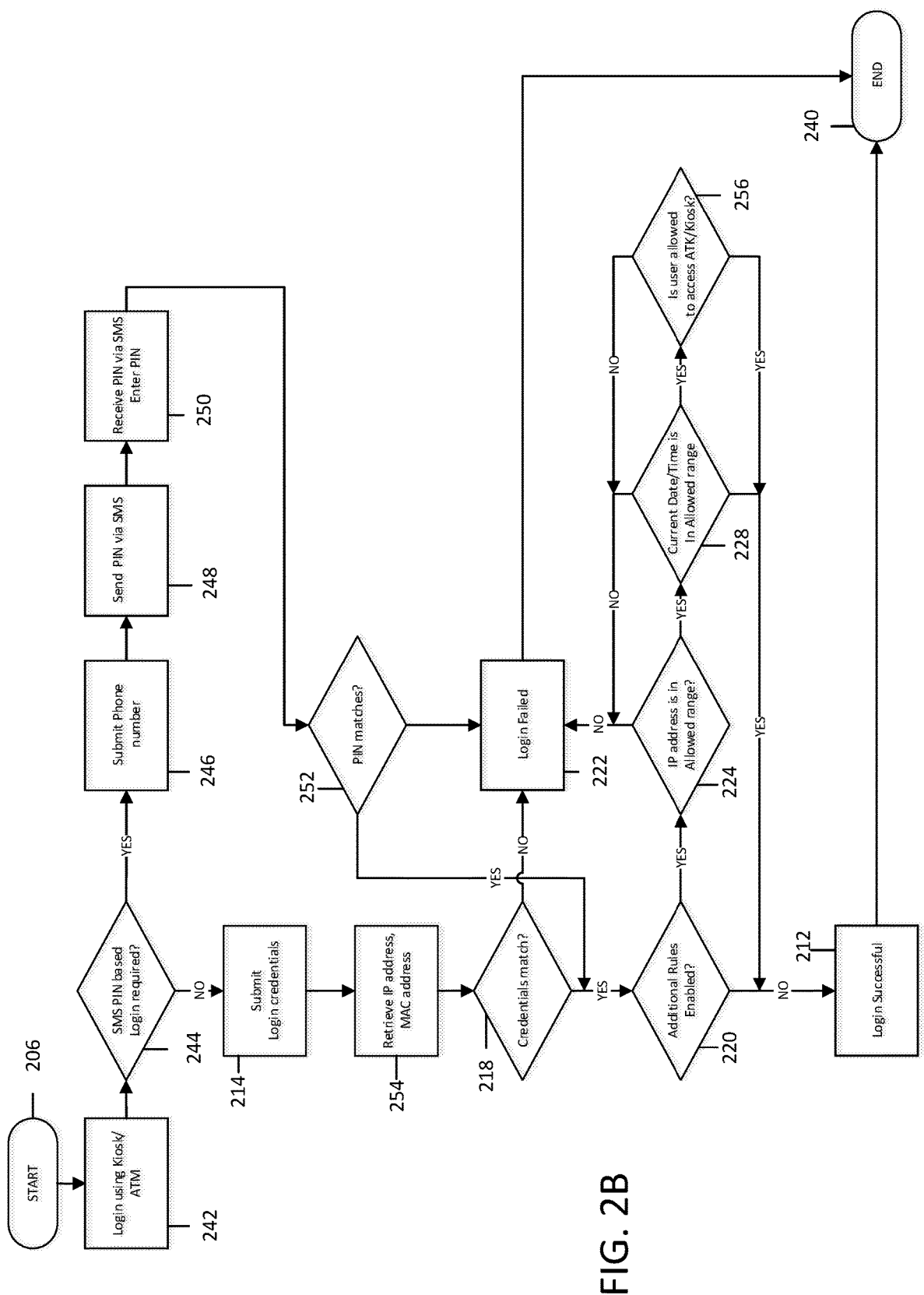
FIG. 2B is a flowchart that illustrates further details of the login and authentication process in a different embodiment.

FIGS. 2A and 2B provide additional details about the login sequences for different types of login devices described in FIG. 1.

FIG. 2A is a flowchart that describes an exemplary login sequence for a login attempt from a Mobile App, or Web Browser, or any other type of personal device. Referring now to FIG. 2A, after the workflow commences at step 202, a login attempt from a Mobile App is detected at step 204. A first check whether biometric login is supported for that user is performed at step 206 in which case, a biometric login sequence is initiated, and the biometrics are verified at step 208, and if the biometric test passes at step 210, rules from a rules engine are applied to check for the eligibility of the user to transact at step 232. At step 234, if the rules engine check has passed, then, the login is considered successful at step 212, and the subprocess workflow terminates at step 240. If, however, one or more rules applied by a rules engine fails for the case, then the biometric login is considered to have failed at step 236, and the subprocess workflow terminates at step 240.

For use cases where biometric login is not enabled, a login screen is displayed, and the user credentials are requested and obtained from the user at step 214.

User credentials may be a login name assigned at the time of initial enrollment, a registered phone number of the user, an email address or an Employee ID of the user. Along with the user credentials, device information such as the geolocation information of the mobile device and its Internet Protocol (IP) address are also retrieved at step 216.

The employee user enters login (e.g., username and password) information and the central system (an authentication processor server) receives that information. Subsequently, the third party computer system determines whether the employee (user) is properly authenticated, that is, whether the login information is recognized and acceptable as an indication of an employee who was enrolled in the system. If so, the process advances to a step 220. Alternatively, if not, the third party computer system can interact with the user in any of a number of manners by which an attempt is made to correct the login/authentication problem—e.g., by recommencing the process ("retry") or engaging in communications with the employer computer system in a manner allowing for the possibility that the employee has forgotten his or her login information ("forgot username/ password"). After the operation(s) associated with a retry attempt are completed (e.g., after the employee has been provided with his or her username or password information that had previously been forgotten), the process returns to the step 214.

If the provided user credentials do not match at step 218, the login is considered to have failed, and the workflow can either terminate at step 240, or alternately (not shown), the user may be prompted to re-enter their credentials. If the provided user credentials do match at step 218, the system checks if additional security rules have been enabled at step 220. These additional rules may be customized to certain employers, certain categories of employees at certain employers, or may be applied across the board to all users, depending on how the system is configured. In an exemplary embodiment, a check may be made at step 224 as to whether the IP address received matches an allowed range of IP addresses. For example, IP addresses from certain regions may be excluded, while IP addresses from where successful logins have occurred over a certain time-frame may be allowed. If the IP address received falls outside the allowed range the login is deemed to have failed at step 222, and the workflow terminates at step 240. Details of the failed login attempt are stored in a database for subsequent analysis.

If the IP address falls within the allowed range at step 224, the geolocation received from the mobile device at step 216 is compared against an allowed range (geofence) for the geolocation at step 226. The geofence may be a combination of system and user defined parameters and may also be defined using a combination of past historical access locations and permitted locations based on the workplace and residential address of the employee. Aspects of this invention may allow for an employee user to define the geofence and also make adjustments to the geofence based on expected travel plans. If the received geolocation falls outside the range, then the login is deemed to have failed at step 222, and the workflow terminates at step 240 and the details of the failed login attempt are stored in a database for subsequent analysis. If the received geolocation falls inside the allowed range, then a check is made at step 228 whether the rules permit an access to the EBU system at the current time and date. If the rules permit an access, then a check is made at step 230 as to whether an SMS based authorization is additionally required, in which case, it is carried out. If step 230 also is successful, then the login is deemed to be successful at step 212.

FIG. 2B is a flowchart that illustrates the login sequence used when an access is attempted from a kiosk or ATM. This sequence may also be used to cover access login processes for use cases when POS terminals or other enterprises act as cash access points, particularly where a multi-factor login sequence may be desirable. This sequence may also be initiated for a device where an assessed security level of the device warrants it.

When an access attempt is made at step 242, the system checks whether an SMS/PIN based login is to be used at step 244, in which case, the user is queried to enter their registered telephone number at step 246. The system, after confirming in its database the existence of that registered phone number then sends a code or PIN to the phone number at step 248, and requests the entry of the PIN by the user at step 250. If the telephone number is determined to not be registered, then the third party computer system interacts with the kiosk in a manner causing the kiosk to show an error message to the employee, and/or causing the kiosk to offer suggestions to the employee (e.g., offering a manner of contacting a helpdesk service provided by the third party).

If the PIN entered matches that which was sent to the registered phone number at step 252, the system goes on to check if additional rules are enabled at step 220. If additional rules are enabled, the workflow follows a pattern similar to that for an access from a Mobile App. Additionally, a check for whether the specific user is also authorized to use the kiosk or ATM is made at step 256. If all the applied rules check pass, then the login is considered to be successful at step 212.

Figure 3A:
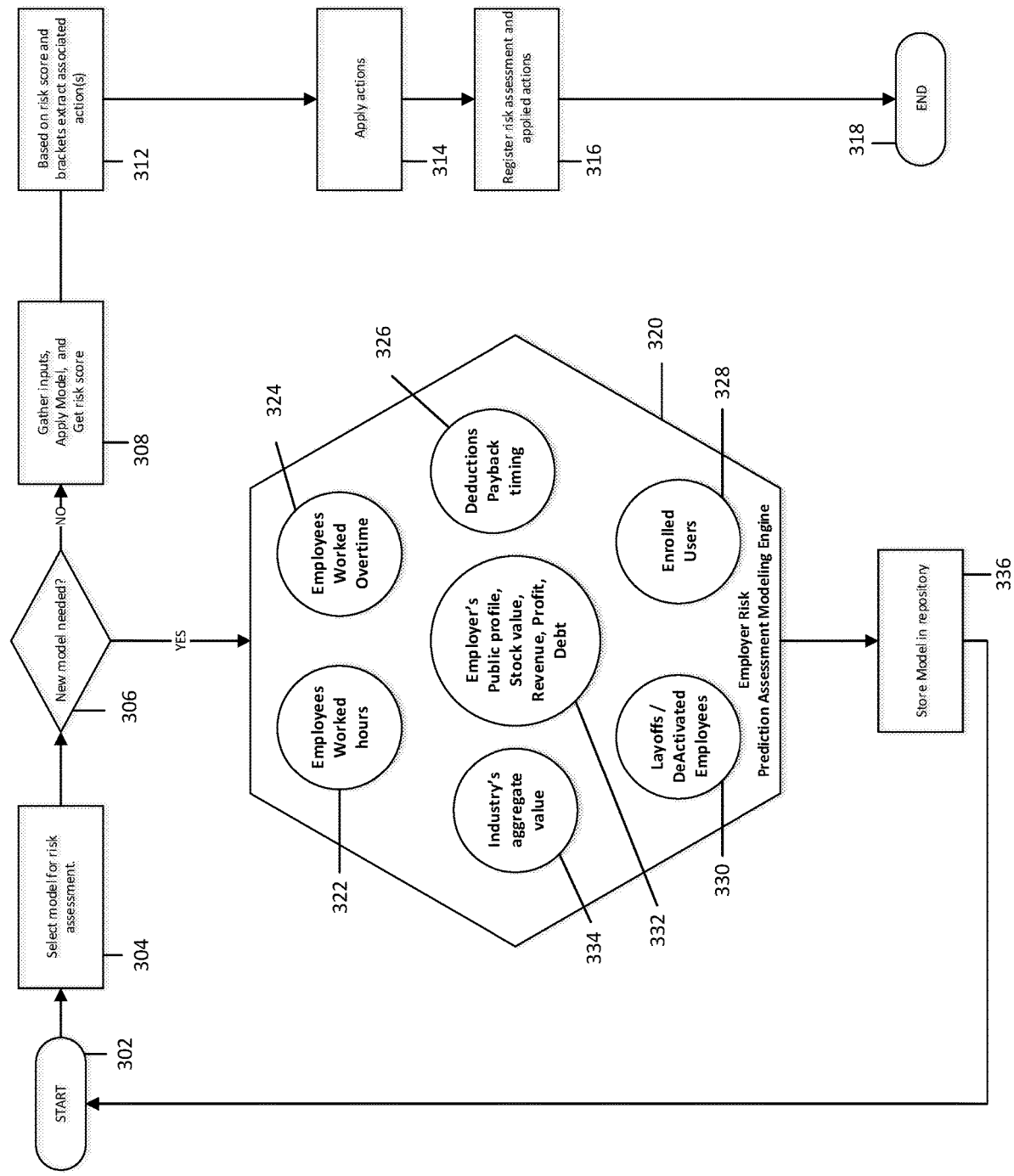
FIG. 3A is a flowchart that illustrates the functioning of an exemplary rules engine that assesses employer level risk built in accordance with a preferred embodiment of the invention.

FIG. 3A is a flowchart that depicts the workflow of an exemplary risk engine that operates to assess and compute the risk associated with the employer for a transaction to be initiated with an employee of that employer. The risk thus computed could influence a variety of actions such as deciding whether to provide access to the earned but unpaid account, rewards payout, fee setting such as charging a reduced fee for transacting, limiting types of transactions and so on. The workflow begins with a selection of a model for risk assessment at step 304, and checks at step 306 if a new model would be needed. This may be necessitated by analyzing the results of the previously generated models and based on application logic that dictates creation of a new model in order to generate accurate results. In the event that a new model is needed, the workflow proceeds to step 320, which is the operation of an Employer Risk Prediction Assessment Modeling engine. This engine uses parameters such as Employee Worked hours 322, Employees Worked Overtime 324, Deductions Payback timing 326, number of Enrolled users 328, Layoffs and deactivated employees 330, Industry's aggregate value 334, and information from the Employer's public profile 332 such as Stock price, revenue, profitability and debt.

After generation, the new model is stored in a repository 336, and the workflow loops back to the start at step 302. If no new model is required at step 306, inputs for the employer whose risk assessment is being undertaken is applied to the model and a risk score is generated at step 308. The risk score thus generated is used to extract actions based on predetermined risk brackets at step 312, and those actions applied at step 314. At step 316, the risk assessment and applied actions are registered and the workflow terminates at step 318.

Figure 3B:
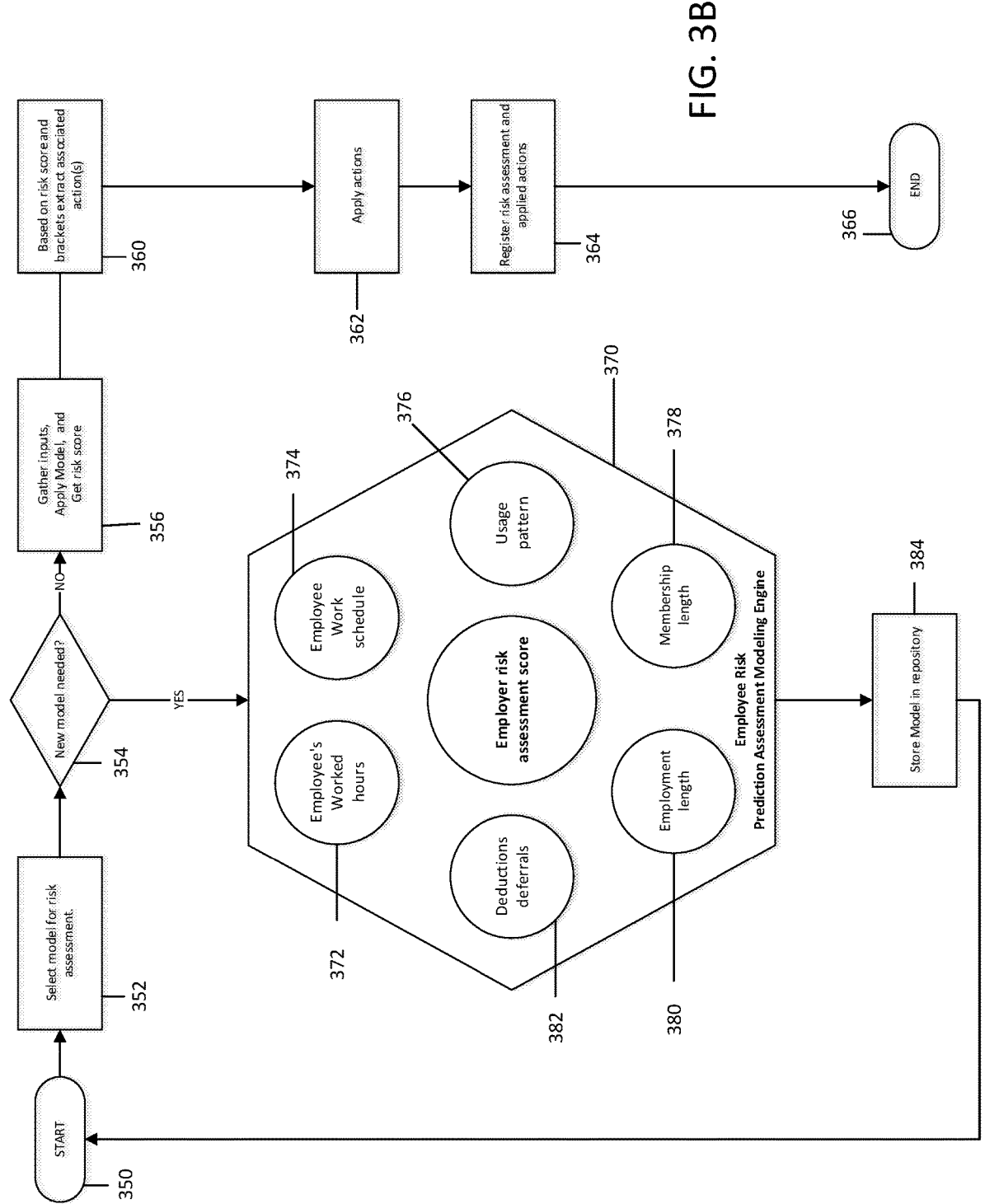
FIG. 3B is a flowchart that illustrates the functioning of an exemplary rules engine that assesses employer level risk built in accordance with a preferred embodiment of the invention.

FIG. 3B is a flowchart that depicts the workflow of an exemplary risk engine that operates to assess and compute the risk associated with a transaction with a given employee based on certain parameters. The workflow starts with step 350, and a model is selected for employee risk assessment at step 352. If a new model is needed at step 354, the workflow proceeds to step 370, which is the generation of a model for computing the risk. The new model is generated using a combination of parameters such as employee worked hours 372, employee work schedule 374, usage pattern 376, membership length 378, employment length 380, and past deductions and deferrals 382. After generation of the model, the model is stored in a repository at step 384, and the workflow reverts to the start at step 350.

If a new model is not needed, the necessary inputs for the model are applied and a risk score is generated at step 356. The risk score thus generated may be used to extract actions based on predetermined risk brackets at step 360, and those actions applied at step 362. At step 316, the risk assessment and applied actions are registered and the workflow terminates at step 366. Each parameter based on set criteria allocates a score between 0 and N where N can be a number specific to the parameter for a specific model. An algorithm compiles all scores after weighting and eventually defines different bands of scores with corresponding sets of actions to be performed.

Figure 4A:
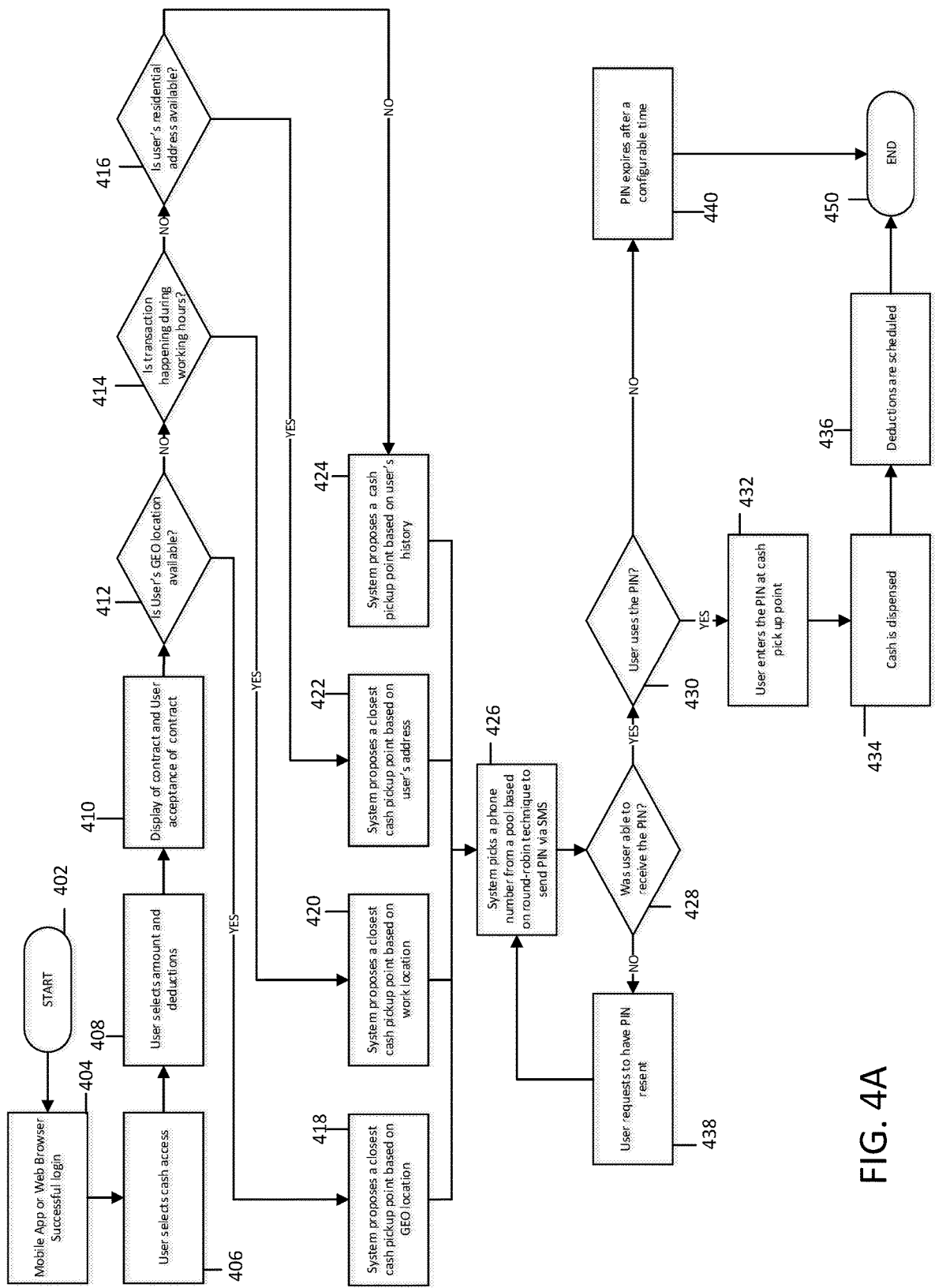
FIG. 4A is a flowchart illustrating steps by which an employee or worker can perform a cash withdrawal in accordance with a preferred embodiment of the invention.

Referring now to FIG. 4A, FIG. 4A illustrates the workflow of an exemplary method for an employee user to access cash from their EBU account, where the transaction is commenced from a device other than a device capable of dispensing cash, such as a Mobile App or a Web browser. The workflow starts at step 402, and after a successful login at step 404, the user selects cash as the transaction option at step 406. At step 408, the user specifies the amount desired to be withdrawn and the number of deductions during which the withdrawn amount and any associated fee is to be deducted from their wages/income. The system checks to ensure that the requested amount and deductions are within the allowed limits for that user and employer and at step 410, a contract is displayed to the user on screen detailing the terms of the agreement. The user indicates their acceptance by means of a checkmark, an air-signature, an on-screen signature, a voice acceptance, or a button. The contract and its acceptance are stored by the system, and at step 412, the system checks if the geolocation of the device is available. If it is available, the system then proposes the closest cash pickup point based on the requested amount, the received geolocation and its internal database of cash locations and availability of cash at those locations at step 418. In some cases, a list of proposed cash pickup points (also called cashpoints or paypoints) may be displayed on a user's screen as a list or using a map.

If the device geolocation is not available, then the system checks if the request is being made during working hours at step 414. If the request is made during working hours, an optional check may be made with the internal database if clock-in information for that user is available, and the system proposes a cash pick point based on the known work location of the employee user at step 420. If the device geolocation is not available and the request is made outside working hours, the system checks if it has details about the residential address of the user, and if so, at step 422, the system proposes a closest cash pickup point based on user's residential address. In the absence of this information, the system may also propose a cash pickup point based on the user's past transaction history at step 424.

In another embodiment, the system may prepare a combined cashpoint list taking all the available device and user information into account and displays a list comprising a cashpoint (also referred to as cash pickup point or cash access point) nearest to the user's current geolocation, a cashpoint nearest to the user's residential address (if known), and the last few cashpoints used by the user, after accounting for cash availability and denomination availability. In another embodiment, the user is also able to search for a cashpoint from a list, or by providing a zip code, or location by name, or on a visual map.

Once the cash pickup points are proposed at any of the steps 418, 420, 422 or 424, the user may select a cash pickup point at step 442 and the system then picks a phone number from a pool based on a round-robin technique to send a code or PIN via SMS to the registered phone number of the user at step 426. The PIN may be a 4-digit or 6-digit numeral or an alphanumeric code. If the user receives the PIN at step 428, she may enter it at step 432, and the entry of the correct PIN number causes the dispensation of the cash at step 434. The system, on confirmation of the cash dispensation, updates a deductions file at step 436 with a schedule of deductions for the user reflecting the amount withdrawn and any fees, and the workflow terminates at step 450. If the user has not received the PIN at step 428, she may request to have it resent at step 438, and the workflow again proceeds to step 426 where the system picks a different phone number to send the PIN out from. The PIN is also preferably set such that it expires after a pre-determines amount of time, and with or without a notification to the user at such time that the PIN expires.

In some embodiments, the user may be additionally asked to choose up to a certain pre-determined number of cashpoints at the time of requesting the access, and the PIN sent is only valid for those cashpoint locations. In other embodiments, the PIN may be valid across all available cashpoint locations, and the display of cashpoints is informational in nature.

Figure 4B:
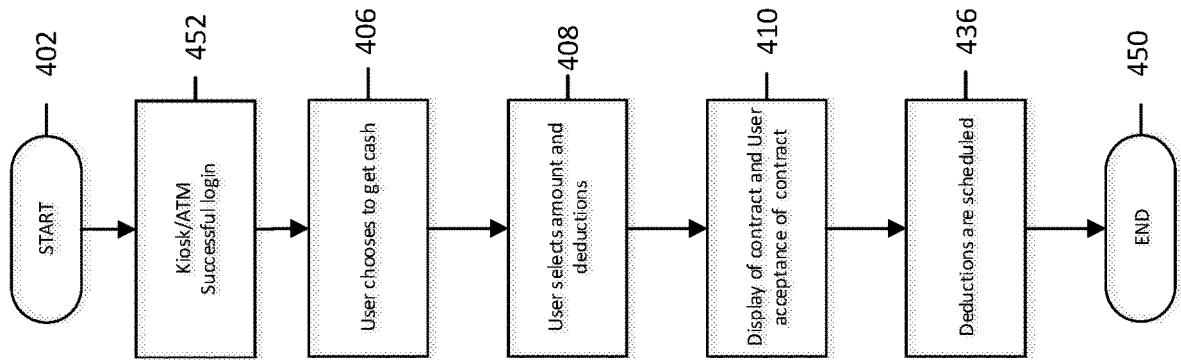
FIG. 4B is a flowchart illustrating steps by which an employee or worker can perform a cash withdrawal in accordance with a preferred embodiment of the invention.

The workflow for cash access where the transaction is initiated directly at a cash dispensation machine such as an ATM or kiosk is shown in FIG. 4B. After a successful login at the kiosk at step 452, the user may request cash at step 406, and selects the amount and deductions at step 408. The display of the contract and its acceptance by the user occur at step 410, and the deductions are scheduled at step 436 and the workflow terminates at step 450.

Figure 5A:
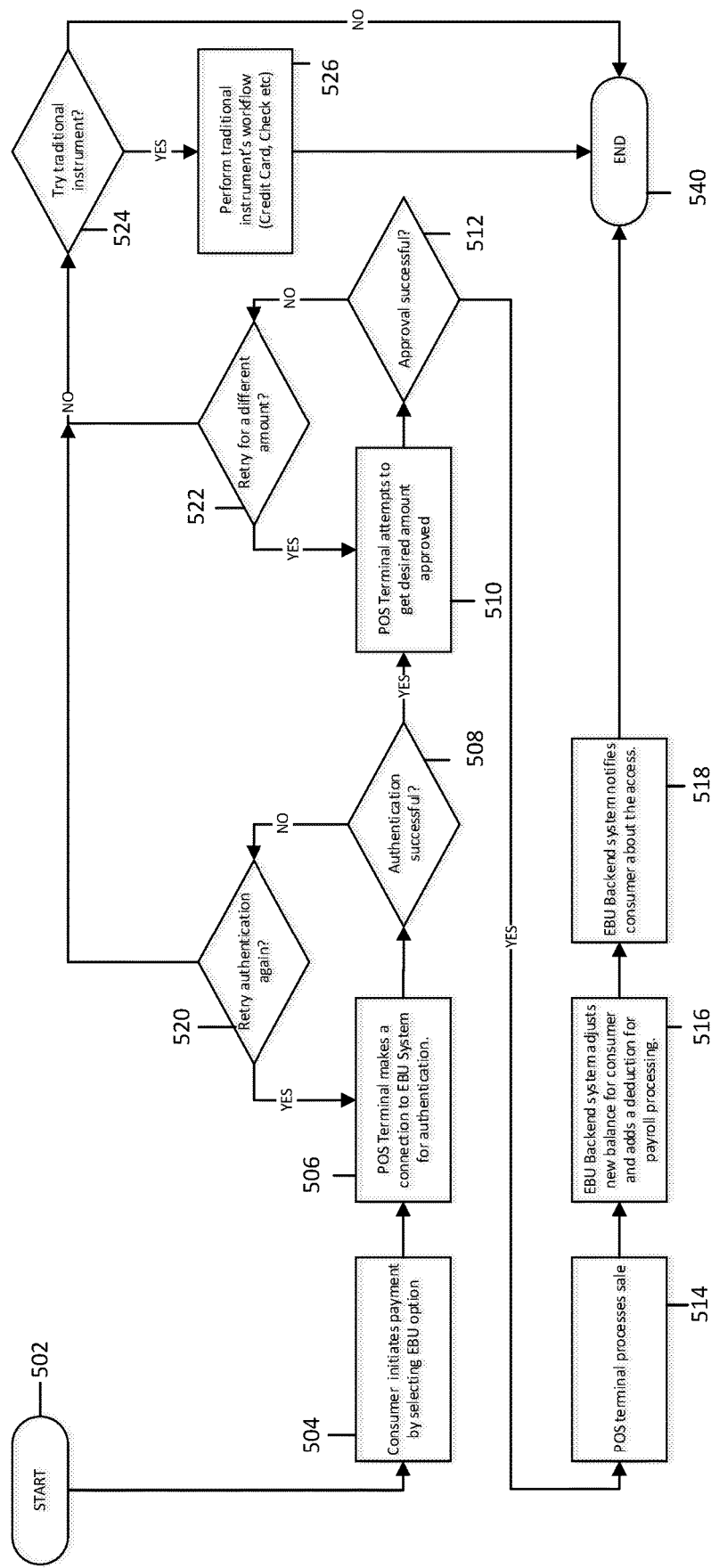
FIG. 5A is a flowchart that illustrates the functioning of a point of sale device operated in accordance with a preferred embodiment of the invention.

FIG. 5A is a flowchart that illustrates the workflow for a system when a request to access and utilize earned but unpaid (EBU) earnings originates through a point of sale (POS) terminal.

The workflow commences 502 with a consumer/user initiating payment by selecting an EBU option at 504. The POS terminal makes a connection to the EBU system for authentication at 506. The authentication may use a variety of methods such as biometrics, login and password, personal identification number (PIN) or a card enabled with a machine readable magnetic stripe or an embedded chip issued against the EBU account of the user. If the authentication is successful at 508, the POS terminal then attempts to get desired amount approved at 510. If, however, the authentication is not successful at step 508, the system checks whether an authentication should be retried at step 520. This would be to facilitate another attempt at authentication, for example, in case a password or personal identification number (PIN) was entered incorrectly. If no retry is to be attempted (for example, if a maximum number of tries is exceeded, or a fraud is suspected), then the workflow proceeds to step 524, where the system checks to see if a different instrument should be tried for the transaction. If a retry is to be attempted, workflow goes back to step 506.

At step 510, when the POS terminal attempts to get the requested amount approved, if the workflow encounters an unsuccessful approval (that is, where an approval is not obtained) at step 512, a check is made whether a different amount should be attempted at step 522. This may allow the user, for example, to still complete the transaction by combining the utilization of unpaid earnings with another source of funds since the EBU balance alone may have been insufficient. In this scenario, where approval for a different amount is to be tried, the workflow proceeds back to step 510 for approval after the appropriate user input. If an attempt to retry with EBU is not to be made at 522, the loop proceeds to step 524, where a check is performed if a different instrument may be used. In the case that a different instrument may be used, the workflow associated with that instrument is performed at step 526, and the workflow terminates at step 540. If no other instrument is to be used, the workflow directly terminates at step 540.

On successful approval at step 512, the POS terminal processes the sale at step 514, and generates the transaction id/approval code(s), which is/are shared with all connected systems. The EBU backend system then adjusts the balance for the consumer with the approved amount, and adds a deduction for payroll processing at step 516. The EBU backend system also notifies the consumer about the access to their account via short message service (SMS), email, direct communication over the internet to a mobile software application (App), or Unstructured Supplementary Service Data (USSD) at step 518. This step also acts as a security step in the event of fraudulent or erroneous utilization of their EBU account. The workflow then terminates at step 540.

Figure 5B:
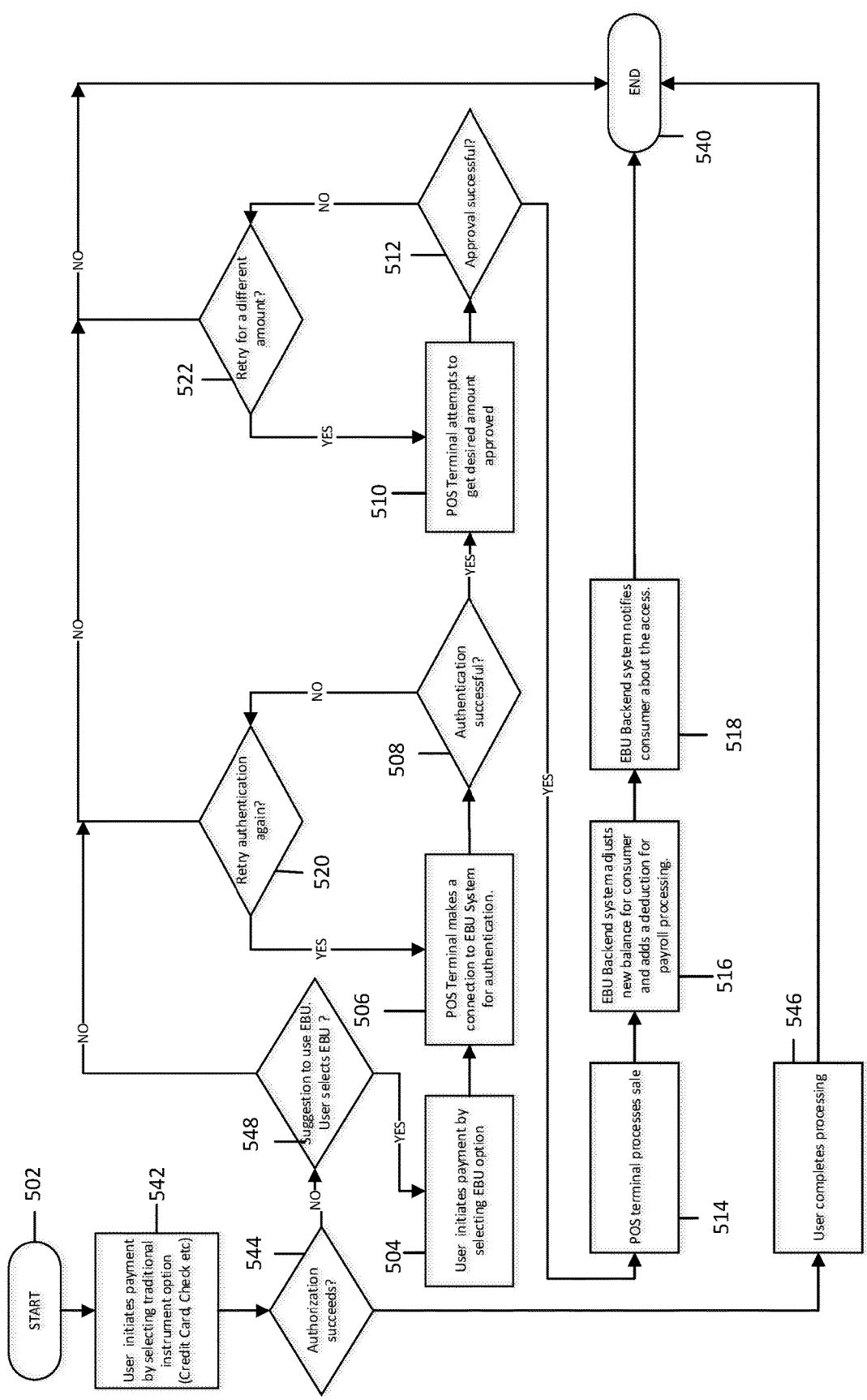
FIG. 5B is a flowchart that illustrates the functioning of a point of sale device operated in accordance in a different embodiment of the invention.

FIG. 5B is a flowchart that illustrates the workflow when POS terminals may be configured such that EBU can act as a backup when a traditional instrument does not succeed.

At step 542, a user initiates payment for a service or a purchase by selecting a traditional instrument option (Credit Card, Check etc). Where the authorization succeeds, the transaction proceeds as it normally would have, with a completion of purchase at step 546, and a termination of the workflow at step 540. If, however, the authorization does not succeed at step 544, the user is offered an option or a suggestion to use the EBU option at step 548. This will be offered based on the POS terminal checking with the EBU system if the transacting user is already enrolled in the EBU system. In certain geographical regions, the EBU option may be offered with the expectation that the user may be pre-enrolled by their employer, and the transaction itself would result in an auto-enrollment in the EBU system. Once the user accepts the EBU payment option at step 504, the workflow proceeds on similar lines to the workflow depicted in FIG. 5A.

Figure 6:
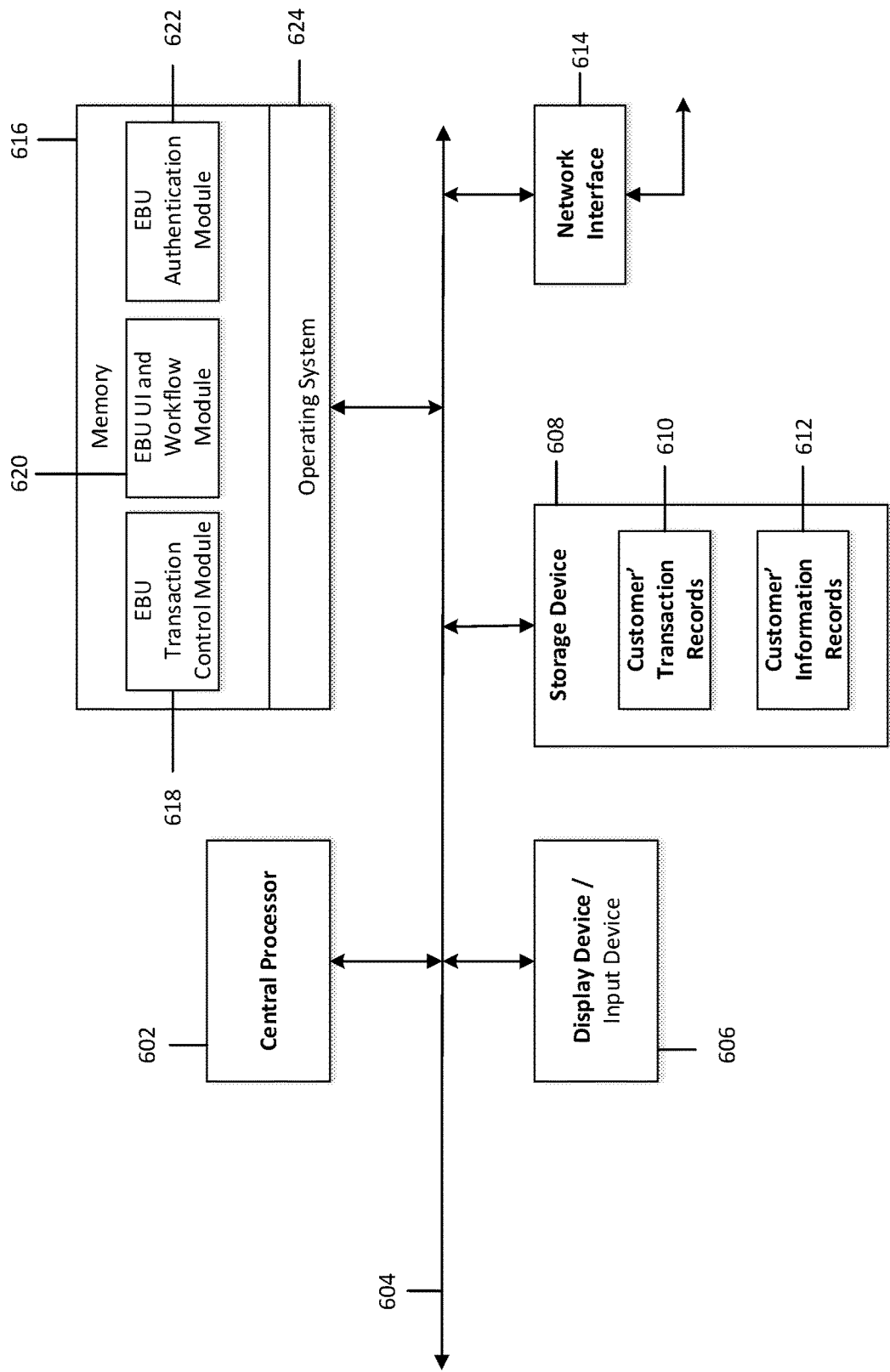
FIG. 6 is a block diagram depicting the different components of a point of sale device built in accordance with a preferred embodiment of the invention.

The integration of a point of sale terminal (POS) with the EBU system is illustrated in FIG. 6. A central processor 602 is communicatively coupled via a central multi-thread bus 604 to various modules such as a Display or Input device 606, a processor 624 which represents the software layer that resides in the memory unit 606 and comprises a EBU Transaction control module 618, an EBU user interface (UI) and workflow module 620 and an EBU authentication module 622. Connected to the bus are also a Storage device 608 which is comprised of customer transaction records 610 and customer information records 612 and a network interface 614, which provides a communication link between the POS terminal and the EBU. The bus is capable of functioning over multiple network protocols.

The Display Device/Input Device 606 can take any of a variety of forms including, for example, a keyboard, a monitor, a mouse or pointing device, and/or a touch screen and also can take the form of multiple user interface devices interacting with one another and/or the other components of the computer system. Also in at least some embodiments, the user interface of the Display Device/Input Device 606 can include one or more sensors including, for example, image or light sensors (e.g., camera devices), position sensors, orientation sensors, accelerometers, etc. Also, the Network Interface 614 is intended to be representative of any of a variety of input and/or output terminals that allow for communication between the terminal and other systems or devices. The one or more input and/or output terminals encompassed by the input/output port 614 further is or are configured to allows for such communications to occur by way of any of a variety of communications media including, for example, wired or wireless communication links and any of a variety of networks or other communication. In this regard, it should particularly be appreciated that the communication network used in at least some embodiments include the internet.

Figure 7:
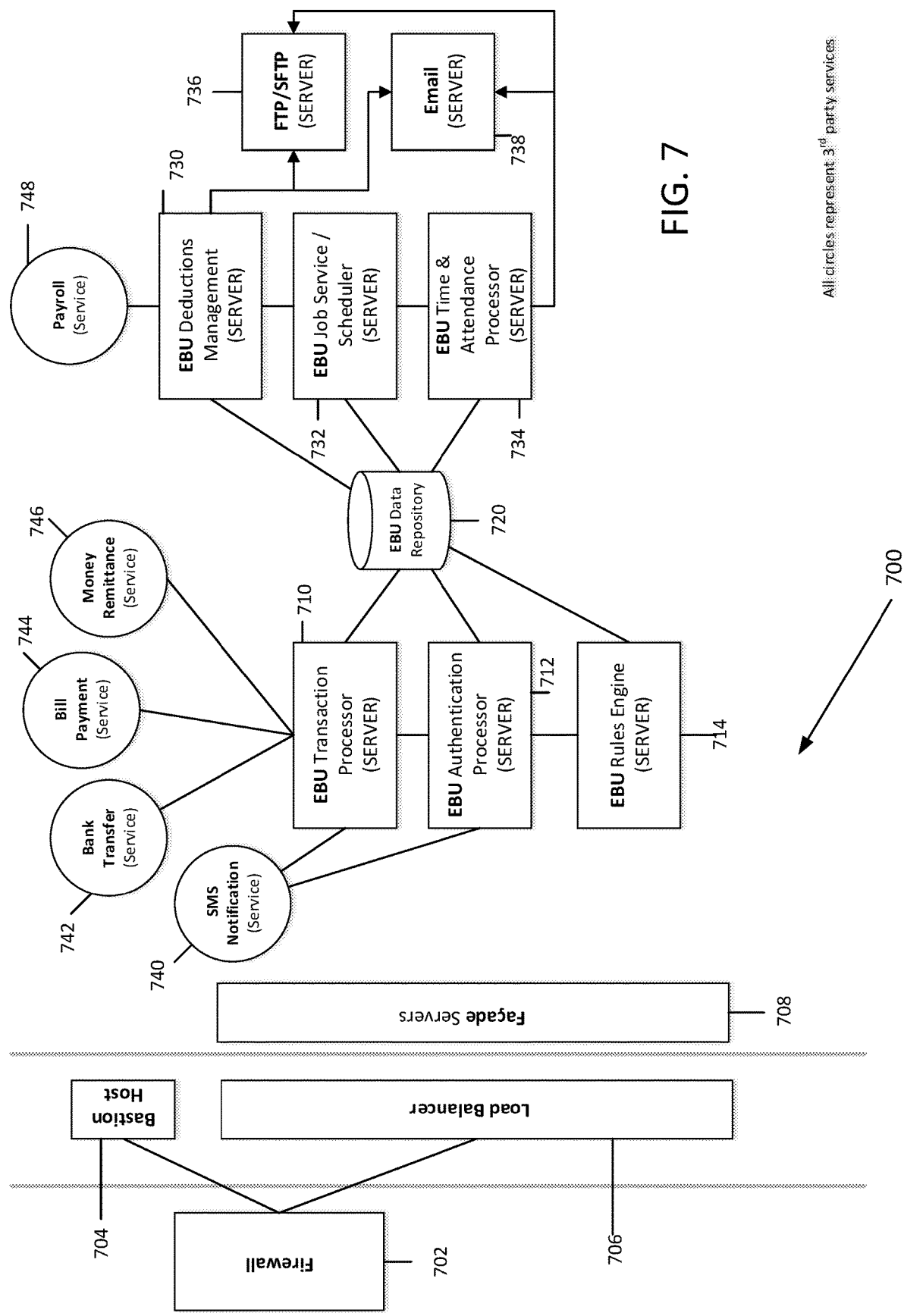
FIG. 7 is a schematic that depicts the architectural elements of a preferred embodiment of the invention.

FIG. 7 is a block diagram that depicts the overall system architecture and the interaction of the various sub-components of a computer system 700. A firewall 702 stands at the outside interface of the system, which is communicatively coupled to a bastion host 704 and a load balancer 706 for distribution of the load that originates from the end points (i.e. Mobile app, desktops, self-service kiosks, and API). A set of façade servers 708 serve the necessary interfaces to end points that are connecting to the system. A central EBU data repository 720 is communicatively coupled to a series of servers assigned with different roles to perform tasks needed for EBU access. An EBU transaction processing system server 710 is the core server accessed through façade servers for the transaction processing.

The EBU Transaction processing server (or Transaction Processor) 710 serves as a transaction processor for performing processing that includes one or more of the following functions:

Employer Enrollment;
Employee Pre-Enrollment & Enrollment;
Transaction Authorization;
Kiosk Based Fulfillment (cash, billpay, remittances, check cashing, other);
Settlement, for example by way of any of Automatic Clearing House (ACH), prepaid card/debit card, eWallet, retail point-of-sale (POS), and/or other systems or mechanisms;
Repayment/Collection (payroll deductions or paid directly to the third party through cash, ACH, credit, debit, check, wire transfer, other);
Operation of the system so as to provide additional products and services such as cash access, Billpay, Remittance, Check Cashing, Savings, Loyalty, Prepaid LD (e.g., long distance) minutes & Cellular Top-Up, Credit Counseling, Credit Reporting, Budgets, Prepaid Cards, Secured & Unsecured Credit Cards, eWallets, Offers & Discounts for good & services and other financial services;
Peer to Peer lending platform for user members; and/or
Multilingual Customer Service supporting all of the above functions.

An EBU Authentication Server 712 is also accessed through façade servers to be able to access the transaction processing access, and an EBU Rules Engine server 714 brings logic that defines user access to the features and the nature of the access—all these three servers work in collaboration. The central EBU data repository 720 is also communicatively coupled to a EBU Deductions Management Server 730 which performs the deduction management including deduction creation, cascading, deletion, processing, exporting, and clearance; an EBU Job Service Scheduler server 732 takes different tasks to schedule and eventually execute to make the system automated, and the EBU Time and Attendance server 734 is responsible for importing, parsing, processing, and calculation of data about the hours worked by an employee. The FTP/SFTP server 736 and an Email server 738 also run in conjunction with these servers. In addition to the servers listed, are services that run attached to the servers such as a Payroll service 748, an SMS Notification service 740, a bank transfer service 742, a Bill Payment service 744, and a Money remittance service 746.

It should be appreciated that any of the referenced servers can take different forms, including being combined in their functioning. Additionally, it should be appreciated that the servers depending upon the embodiment can take any of a variety of system forms that perform the execution of software code, perform processing or tasks, operate in accordance with instructions, or otherwise serve a processing purpose. For example, in at least some embodiments, the core server can take the form of a microprocessor, the form of one or more other processing devices such as programmable logic devices, or can take the form of multiple processing devices interacting with one another. In general, the present disclosure is intended to encompass a variety of embodiments of processing systems and devices including processing systems and devices employing hardware, software, firmware, middleware, microcode, hardware description languages, or any combination thereof.

Also, the central EBU data repository 720 depending upon the embodiment can take any of a variety of forms including, for example, a distributed database, and also can take the form of multiple memory devices interacting with one another. Indeed, the memory can encompass any one or more devices for storing, containing, or carrying information, instructions, or data, including read-only memory (ROM), random access memory (RAM), magnetic RAM, core memory, magnetic disk storage media, optical storage media, flash memory devices, or other computer-readable media (e.g., portable or fixed storage devices, optical storage devices, wireless channels, a SIM card, other smart cards, and various other media) capable of storing, containing, or carrying information, instructions, or data. When implemented in software, firmware, middleware, or microcode, program code or code segments employed to perform the processing or tasks can be stored in such memory or computer-readable media.

In some embodiments the computer system 700 and particularly the servers and database thereof may be owned and operated by the third party (e.g., a computer server owned and operated by the third party), and in other embodiments they are provided by the third party by utilizing still another party's processing and/or memory resources in a manner partly, substantially, or entirely controlled by the third party, for example, by utilizing cloud computer services, particularly cloud computer services that provide a secure storage mechanism for data (e.g., so that the data is exclusively accessible by the third party/third party computer system(s)) as well provide processing services.

Figure 8:
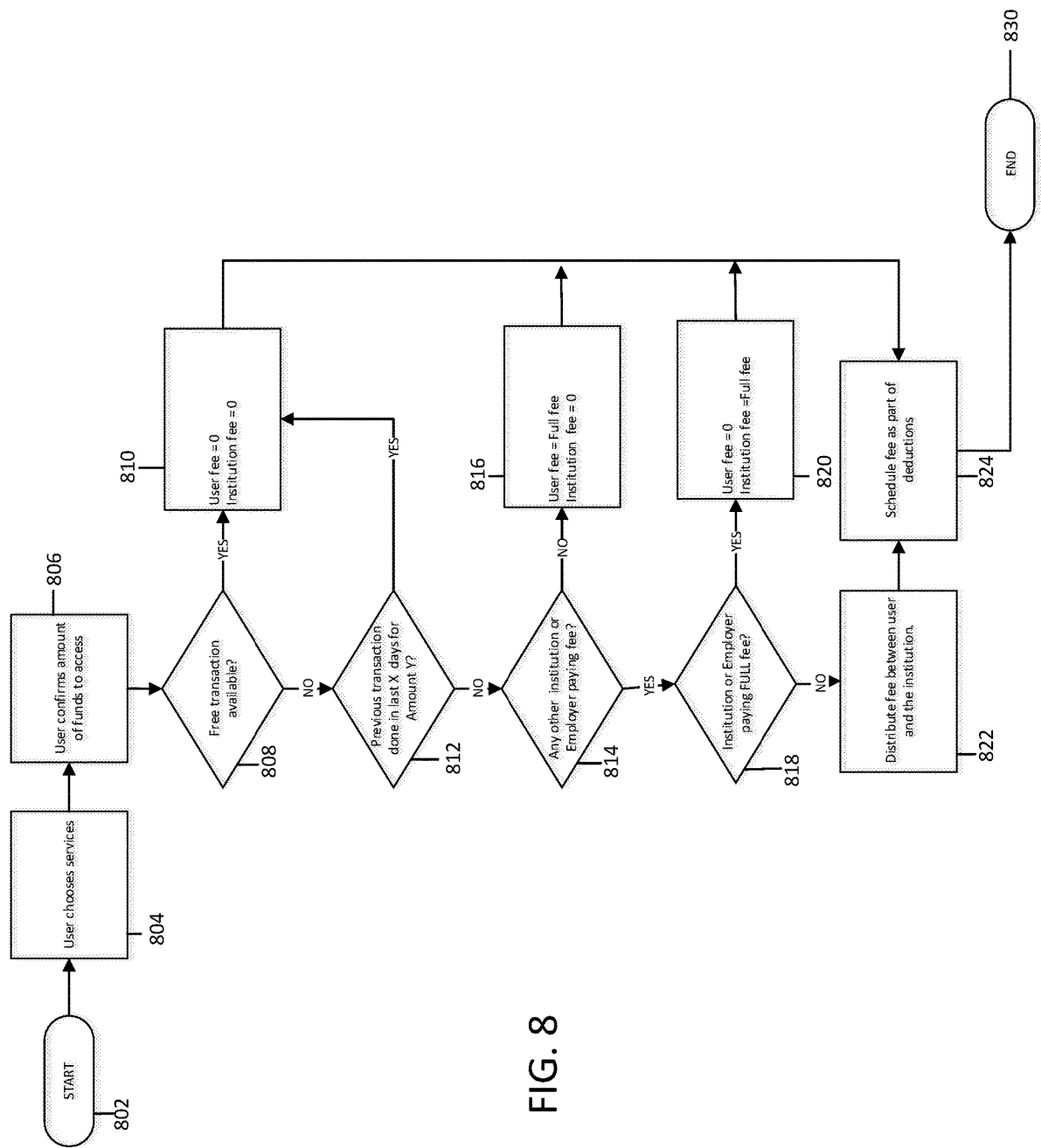
FIG. 8 is a flowchart that illustrates the functioning of a fee setting module built in accordance with a preferred embodiment of the invention.

FIG. 8 is a flowchart that depicts the workflow that may be used in setting fees in an exemplary embodiment. Fees may be user fees that are charged to the user directly, while institution fees are charged to some other entity such the user's employer, a non-profit organization, the government, or any other person or institution. The fee may be a fixed fee, or may be a variable fee that is adjusted based on the employer, or adjusted based on the risk perception of the employee user or the employer. The workflow starts at step 802, and a user chooses one or more from the offered set of services (cash access, bill pay, money transfer etc.) at step 804. The user confirms the total amount to be disbursed from their EBU account at step 806. The workflow proceeds to step 808, where the system checks to see if a fee free transaction is available to the user. This could be because of a promotional offer to the user, a promotional offer to all employees of a given employer, or an offer as a reward for past transactions. If a fee-free transaction is available, the user fee and institution fee are both set to zero, and the workflow proceeds to step 824, which updates the deduction file with the zero fees and the workflow then terminates at step 830.

If no fee free transaction is available to the user, the workflow proceeds to step 812, where the system checks if the user performed another transaction up to a certain predetermined threshold in a preceding predetermined time interval. This is to ensure that users are not charged fees for transactions that are closely spaced and to discourage high withdrawals merely on account of fees. The system then checks at step 814 whether for this user, any part of the fee is to be charged to an institution such as an employer or another entity, someone other than the user. If no part of the fee is to be charged to an institution, the workflow proceeds to step 816, where the full fee is charged to the account of the user, the fee scheduled as part of the deductions at step 824, and terminates at 830.

If any part of the fee is to be charged to an institution, then a check is made at step 818 as to whether the entire fee is to be borne by the institution, in which case the institution is assigned the fee at step 820. The deductions are scheduled at step 824, and the workflow terminates at 830. If the fee is to be distributed between the user and institution at step 822, the user fees are scheduled as part of the deductions at step 824, and the workflow terminates at 830. Separately, any fees that are to be assigned to an institution are consolidated and billed.

Figure 9A:
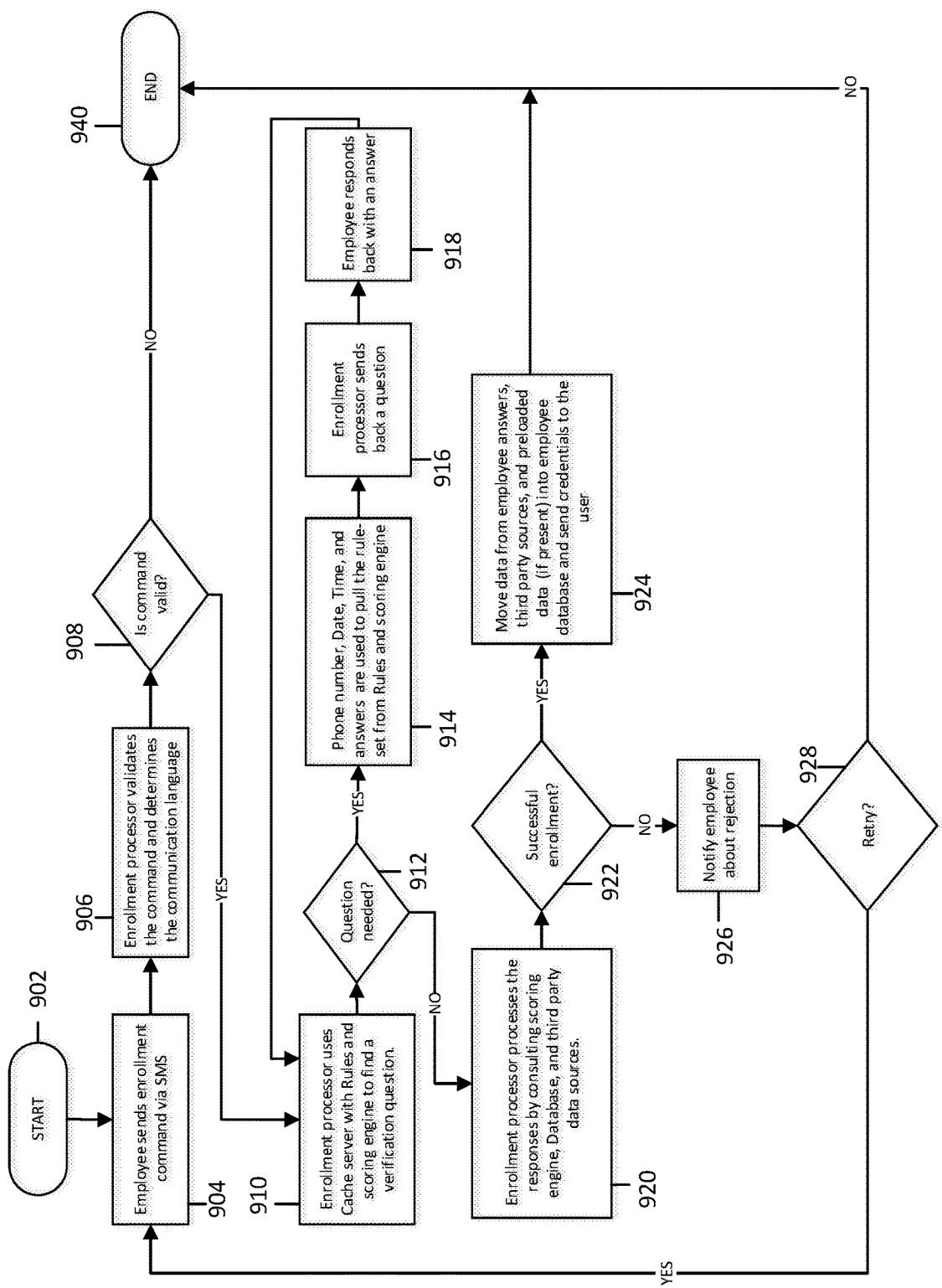
FIG. 9A is a flowchart that illustrates the salient aspects of the onboarding process in a preferred embodiment of the invention.

FIG. 9A is a flowchart that illustrates an exemplary workflow by which employees are first on-boarded or enrolled in the system. In this embodiment, a mobile phone based or subscriber message service (SMS) based method is envisaged for enrollment, wherein based on a received text message/SMS, the backend checks against pre-enrolled data and, and if a sufficient number of fields from first name, last name, date of birth or employee id match, the employee is enrolled, and a welcome message is sent. Different destination phone numbers may be provided to employees from different employers in order for the system to uniquely identify the employer when the SMS is received.

Employee pre-enrollment is achieved by way of a client-server model of interaction in which the employer computer system accesses a website or portal provided by the third party computer system 700, downloads web pages from that website, and receives from and provides to that website various information. The employer gets a secured account and access to the third party's online portal. Assuming that such account setup has been performed, at a next step, the employer computer system as operated by an administrator employed by or otherwise associated with the employer associated with that employer computer system successfully logs in to the portal so as to establish the portal session.

Once the third party computer system 700 determines whether the employer computer system that has logged in has privileges to pre-enroll employees on behalf of the employer associated with employer computer system, employee information is uploaded from the employer computer system to the third party computer system. In at least some embodiments or circumstances, the website of the third party computer system 700 provides web pages that allow for one or both of a "bulk upload" interface or a "new employee" interface to be utilized for the uploading of employee information.

In the present embodiment the third party computer system 700 of the third party utilizes a data encryption process to enroll employees into the program, and this mechanism generally disallows personal identifiable employee data to be viewed or retained by the third party without employee consent. The third party computer system preferably generates an encryption code or key ("EMPL-KEY") that is specific for the employer associated with the employer computer system, and provides that key to the employer computer system 130 for receipt and use by the employer administrator. Further, once the encryption key has been assigned and sent to the employer computer system, then that employer specific encryption key is used to encrypt and store the employee personal data that was uploaded.

Exemplary employee data elements include:
(a) First Name
(b) Last Name
(c) Employee ID
(d) DOB (date of birth)
(e) Residence Zip Code
(f) Email address (optional)
(g) Mobile # (optional)
(h) Last 4 digits of SS # (TBD)
(i) Hourly Pay rate During the upload process, at least the employee data (d) through (i) is encrypted, using the unique encryption key assigned to each employer. Further, in a preferred embodiment the employee data (a) through (c) and only encrypted data (d) through (i) is received and retained by the third party computer system 700.

It should be appreciated that the process of employee pre-enrollment, in at least some embodiments, is limited to employers that have been approved by the third parties associated with third party computer system(s) 110 and accordingly have privileges to pre-enroll. In granting such privileges to various employers, the third parties can take into account any of a variety of factors, and the accounting for such factors can, in at least some embodiments, be partly or entirely automated. For example, in at least some embodiments, the third parties and/or the third party computer system(s) can take into account one or more of the following factors (which can be generally considered as regulatory, risk, and/or quantitative factors) to determine the eligibility of various employers to interact with the system, allow for the employees of the employers to access or use the services made possible by way of the EBU system (that is, allow the employers to make available access to the EBU program to its employees).

More specifically, the process starts at 902, with an employee or user sending a request via a text message or SMS 904. A preferred method is to use a string that is configurable such as "enroll me".

An enrollment processor receives the message and the contents of the message are parsed to ascertain the language of the command received and its validity at step 906. Multiple strings may be used to initiate the same workflow—this may be needed in order to support multiple languages, and to allow for minor typographical errors and variants in spelling.

If the command is determined to be invalid at step 908, the process terminates at 910. This could be a situation where the phone number that receives the text message is not expecting an enrollment message. In this scenario, the message is ignored but may be logged for review. Alternately, the phone number that receives the text message (which is communicatively coupled to the enrollment server) is expecting enrollment SMSs but gets an empty text message. In this scenario, this entry is logged in the database, and a screen view in a "Customer Service" tab shows the request with a check-box column (not checked)—the reason it is not-checked is to ensure that a call is placed for proceeding with enrollment. The view may have fields such as Serial Number, Employer Name for whom enrollment request was submitted, Timestamp when the request was received, the receiving phone number (the one that the SMS was addressed to), Sender's phone number, a checkbox as to if the request was processed or not, and the contents of the text message.

If the command is valid at step 908, the enrollment processor uses its Cache along with a Rules engine and a scoring engine at step 910 to check if a verification question is required or whether enrollment can proceed without any additional verification.

If it is determined that a further question is required at step 912, the workflow proceeds to step 914 where the already received data such as Phone number, Date, Time, and answers are used to pull a rule-set from the Rules and scoring engines, based on which the Enrollment processor sends a query or question back to the employee at step 916. The language for communicating with the user is based on smart logic; for example, if the communication starts with a Spanish command the questions are all asked in Spanish. If the enrollment processor sees it is inside enrollment window it responds back with a question such as "please enter your employee ID". Based on the response, and on determining that it is an employee ID that is being received, the system checks the database and if there is an employee id that is not enrolled yet and the sender's phone number is also not enrolled then the rules engine determines if a new question needs to be asked. If a new question is to be asked, then a new question such as "enter your date of birth in MMD-DYYYY format e.g. Jan. 1, 1980 should be sent as 01011980" is asked.

Once the employee responds back with their answer(s) at step 918, the workflow reverts to step 910, where the Enrollment processor processes the newly received data in conjunction with the data already received and to step 912, where the determination about additional data is made. If it is determined at step 912 that no further verification is required, then the Enrollment processor next processes the responses using the scoring engine, Database, and third party data sources at step 920.

After this processing, a determination around successful enrollment is made at step 922; if the enrollment is deemed successful, the workflow proceeds to step 924 where the data from employee answers, third party data sources, and pre-loaded data (if present) are moved into employee database and credentials along a message of successful enrollment is sent to the user, after which the process terminates at step 940 upon successful enrollment. If at step 922, the enrollment is deemed unsuccessful, the user or employee is notified about the rejection at step 926, and given an option to retry at step 928. The reason for rejection is captured for subsequent enquiry and debugging.

If the process is to be retried based on user feedback and settings, the workflow reverts to step 904 for repeat of the workflow. If no retry is offered or chosen, the workflow terminates at step 940.

An example realization of the workflow is now described in greater detail. The following configurations are first established. A phone number capable of receiving text messages (SMS) is identified in a backend computer system, and more particularly, within a server. Certain system level variables are defined, which may be configurable from implementation to implementation. A time range is defined and "From" and "To" timestamps are identified in order to indicate an active time range. In addition, one or more employer IDs are identified whose enrollment needs to take place. A list is established of phone numbers and email addresses which get notifications when a request is received.

The number of allowed attempts to enroll is defined (If a phone number exceeds the specified attempts, then no further requests are entertained). A default number of attempts may be set, for example, to 3 or 5.

Criteria are also established for the rules and scoring engine 122, which specify the rules based on which matching and verification of data needs to take place for enrollment. Some suggested options may include Employee ID, First Name+Last Name+Date of Birth (DOB) (e.g. John+Smith+12301990), Date of Birth (DOB) (in MMDDYYYY format). A case insensitive comparison may be used, with trimmed spaces around the '+' sign, though other similar data may be used. A database and cache are also loaded with all employees' data of the employer of interest.

In some cases, employers may wish to individually approve the employees. For such cases, a preferred embodiment is proposed where, once the data is verified as described earlier, a communication, which could be in the form of an email or a file exchange, or some other manner of data exchange is sent to the employer or employer database, and once that approval comes, the employee is considered enrolled, and a message sent to the employee regarding successful enrollment.

Figure 9B:
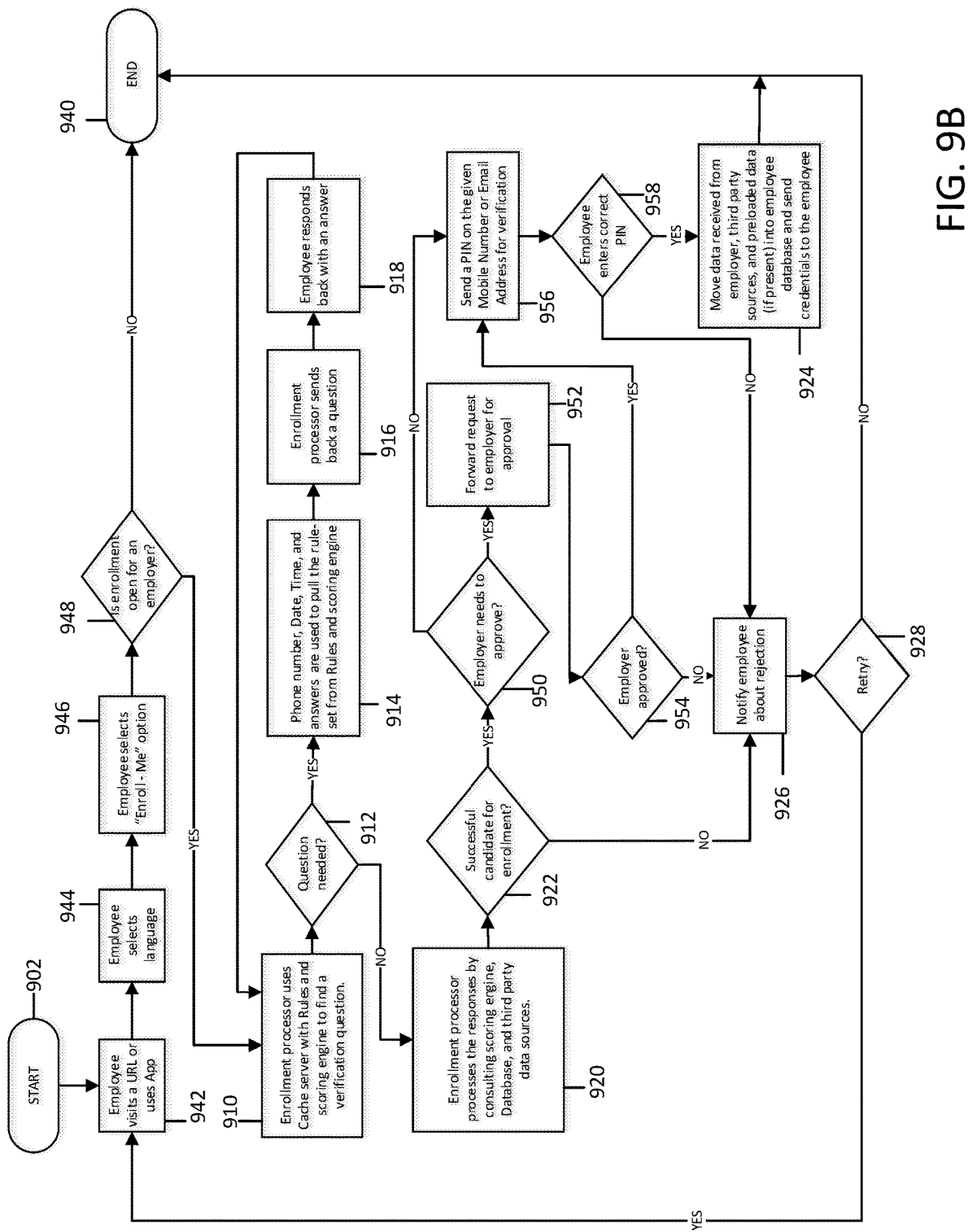
FIG. 9B is a flowchart that illustrates the salient aspects of the onboarding process in a different embodiment of the invention.

FIG. 9B is a flowchart illustrating the workflow for a web based enrollment. A user or employee uses either a Mobile Application ('App') or browser at step 942, proceeds to select a language at 944, and then selects a button or icon signifying enrollment such as an 'Enroll me' option at 946. The enrollment processor checks to see if enrollment is open for the given employer at step 948. If enrollment is not open, the process terminates at step 940, along with conveying a suitable message to that effect.

If enrollment is open, the enrollment processor uses its Cache along with a Rules engine and a scoring engine at step 910 to check if a verification question is required or whether enrollment can proceed without any additional verification. If it is determined that a further question or data is required at step 912, the workflow proceeds to step 914 where the already received data such as Phone number, Date, Time, and answers are used to pull the rule-set from the Rules and scoring engines, based on which the Enrollment processor displays a query or question back to the employee at step 916.

Once the employee responds with their answer(s) at step 918, the workflow reverts to step 910, where the Enrollment processor processes the newly received data in conjunction with the data already received and to step 912, where the determination about additional data is made. If it is determined at step 912 that no further data is required, then the Enrollment processor next processes the responses using the scoring engine, Database, and third party data sources at step 920. After this processing, a determination around successful enrollment is made at step 922; if the enrollment is deemed successful, the workflow proceeds to step 950, where it is checked whether the employer needs to approve the request.

If an approval is required, the enrollment request is forwarded to the employer at step 952. If the employer approves at step 954, a PIN on the given Mobile Number or Email Address is sent for verification at step 956. Once the employee authenticates their identity by entering the correct PIN at step 958, the data from employee answers, third party data sources, and preloaded data (if present) are moved into employee database and credentials along a message of successful enrollment is sent to the user at step 924, after which the process terminates at step 940 upon successful enrollment. If the employer disapproves the request at step 956 or an incorrect PIN is entered at step 958, the employee is notified about the rejection at step 926, and given an option to retry at step 928.

If at step 922, the enrollment is deemed unsuccessful, the user or employee is notified about the rejection at step 926, and given an option to retry at step 928. If the process is to be retried based on the user feedback and process settings, the workflow reverts to either step 942 for repeat of the workflow, or alternatively to step 944 or 946 (reversion to 944 or 946 is not shown in the Figure). If no retry is offered or chosen, the workflow terminates at step 940.

Figure 10:
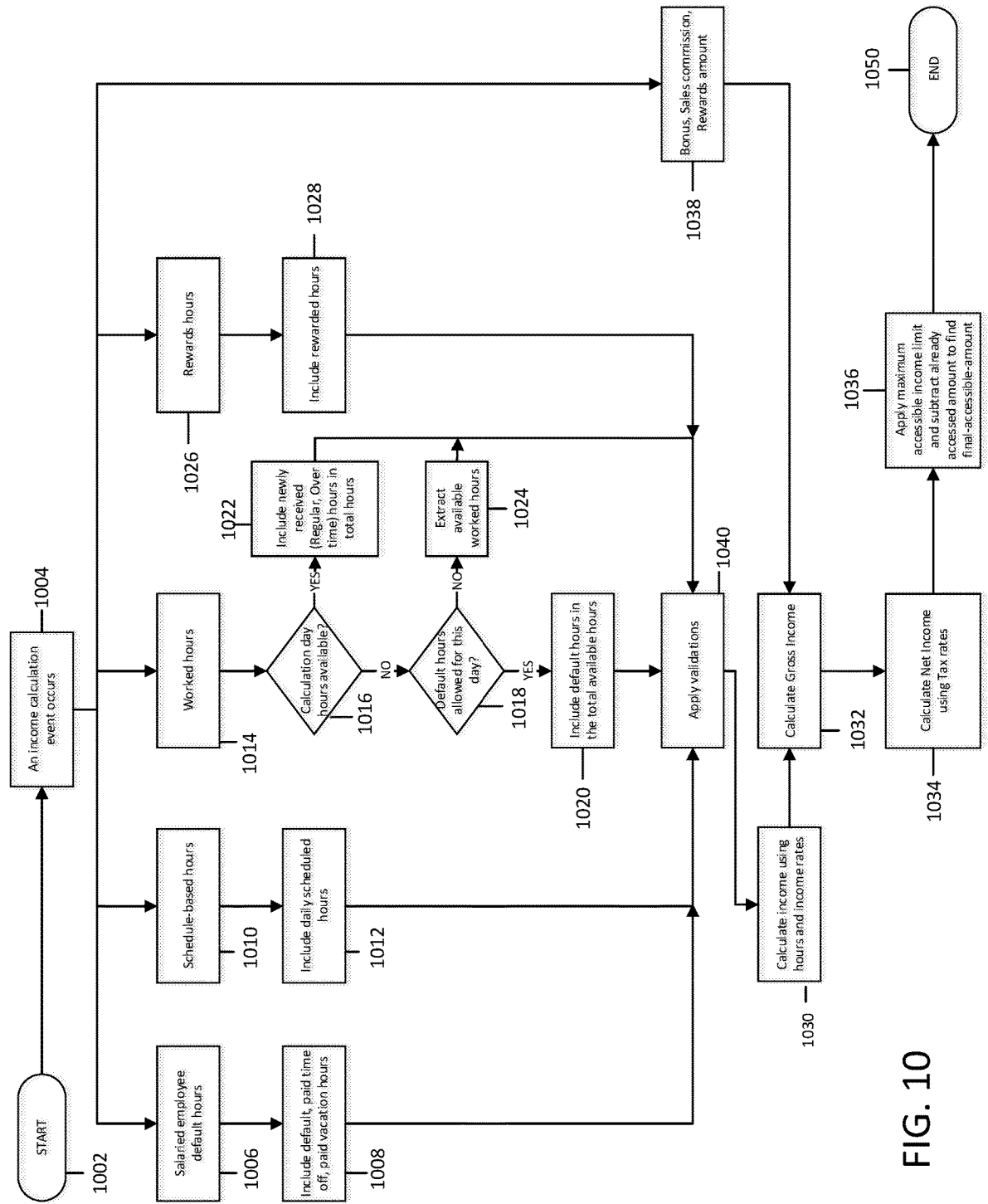
FIG. 10 is a flowchart that illustrates the incorporation of the time and attendance data into the computation of an available balance to an employee in a preferred embodiment of the invention.

FIG. 10 illustrates the workflow in an exemplary embodiment by which Time and Attendance data is incorporated into the computation of the accessible income for a user enrolled/registered in the system. The workflow is typically triggered by the occurrence of an income calculation event at step 1004. Examples of income calculation events include scheduled events such as daily, hourly updates, pay cycles, or an update at a pre-determined time. Trigger based events such as Deduction clearance or access could also be income calculation events. It is to be noted that an income calculation triggering event may occur asynchronously relative to a predetermined schedule by which the employer may share actual data about the employee's work hours. The workflow proceeds next along different paths depending on the nature of the user. For salaried employees, at step 1006, the default salary based on the last update from the employer along with any paid time off hours and paid vacation hours are used at step 1008, after which validations are performed at step 1040 to weed out any possible errors that may have crept into the database. For example, a maximum for daily worked hours could be set to 10 hours, or 12 hours to account for incorrect clock-in/clock-outs. For hourly employees where the current actual hours are not available, as in step 1010, the daily scheduled hours are used in step 1012, after which the workflow proceeds to the validation step at step 1040. If the actual worked hours are to be used, as in step 1014, the system checks of the hours for the day on which the calculation is being performed is available at step 1016. If those hours are available, then the newly received (Regular, Over time) hours is included in the total hours at step 1022, after which the workflow proceeds to the validation step at step 1040. If the hours for the day are not available at step 1016, the system checks to see of default hours may be used at step 1018, in which case, the default hours are used for the computation at step 1020, and the workflow proceeds to validation at step 1040. If default hours cannot be used at step 1018, then any available worked hours are extracted and used at step 1024 after which validation is performed at step 1040. For employees with rewards hours 1026 either from loyalty points available in the system, or from employer rewards, the available reward hours are used at step 1028.

After the validation step at 1040, the system calculates the income using the hours from step 1028 and the income rates for each employee. A gross income is computed at step 1032, and a net income is computed at step 1034. The final accessible amount is computed at step 1036 after subtracting any already accessed amounts after limiting the net income to a maximum accessible income limit, and the workflow terminates at step 1040.

Figure 11:
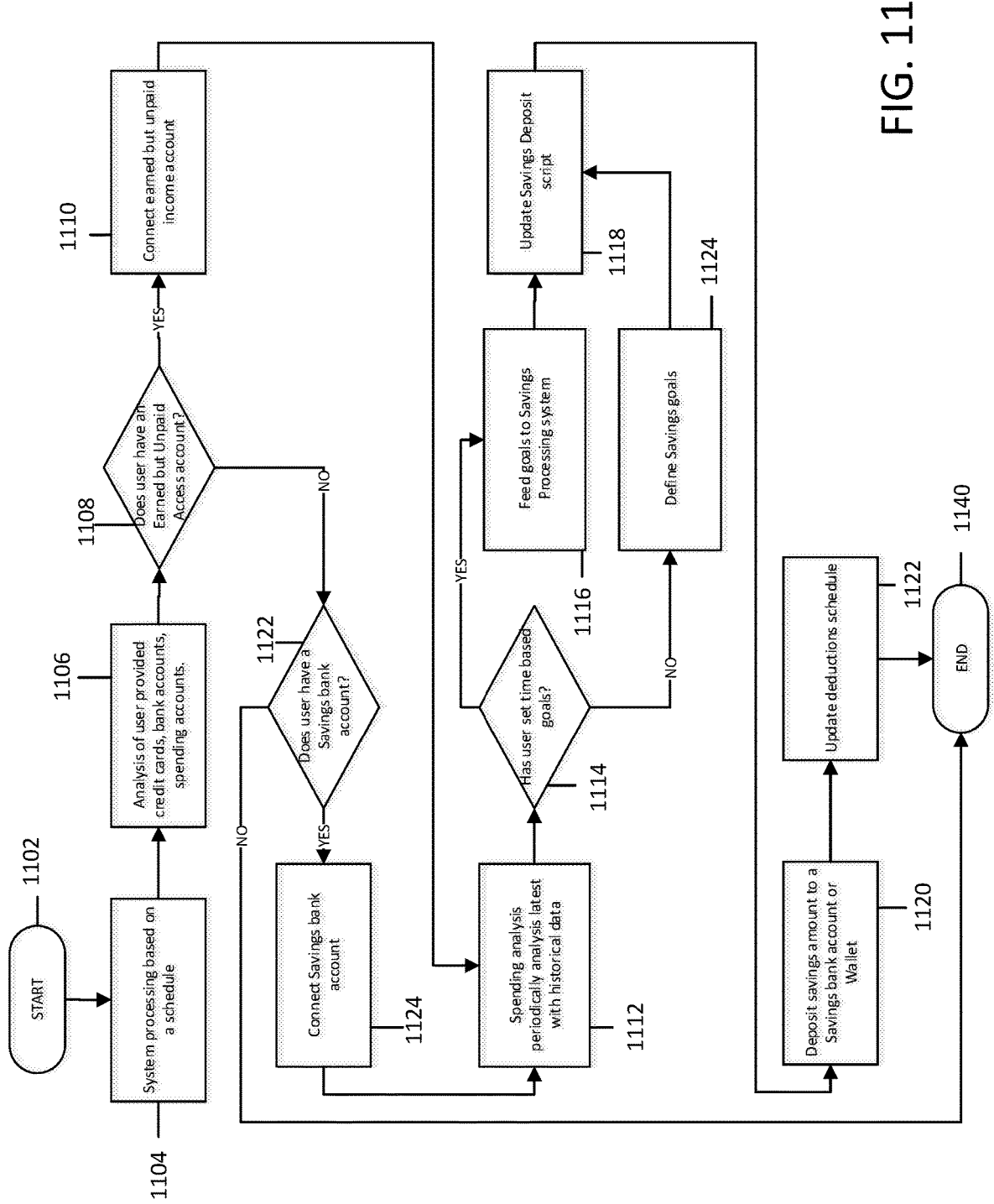
FIG. 11 is a flowchart that illustrates the use of a preferred embodiment of the invention to enable workers to perform savings transactions from their earned but unpaid income.

FIG. 11 illustrates an exemplary embodiment of the invention depicting the workflow for the utilization of EBU for savings.

The workflow commences at 1102, and based on a predetermined trigger or time-period at step 1104, an analysis of user provided credit cards, bank accounts and optionally, manually entered data about user's spending is performed at step 1106. This access is typically read-only access, since no transactions will be performed by this subsystem. A determination is made whether the user has an Earned and unpaid earnings access account at step 1108. If the user does have an Earned and unpaid earnings access account, that account is then connected to this user's savings account at step 1110. If the user does not have an earned or unpaid earnings account, then a check is made at step 1122 as to whether the user has a savings account, in which case, the savings account is connected at step 1124. Once either of those accounts are connected, the workflow proceeds to step 1112, where a spending analysis is performed, where newly received data about the user's spending is compared to historical data. If the user has neither account, workflow terminates at step 1140. Next, at step 1114, a check is performed if the user has pre-set time based savings goals. If the user has not set goals, then Savings goals are defined at step 1124. When the user indicates that she or he wants to start a savings program, the user is queried about how much and what schedule needs to be followed. The user's hourly rate is displayed, and the user can either save by time, in which case the hours and minutes she/he wants to save with the cycle such as Day/Week/Month/Payroll is selected. Alternately, user can set an amount goal such as $500 or $1000. For this option, the user is queried "by when" and user picks the date as to by when she needs that much of money be saved. Once this data is captured, the system runs a rules engine, and checks whether user earns enough to save that much and also, whether savings is allowed based on the program she is a member of. If the user has selected a time based plan, the user is then showed how much they would have saved in the coming time period. If the user has selected a fixed amount, then the user is shown the proposed hours and minutes she would be saving on a daily basis. The calculated and entered fields are displayed to the user, and then the user is given the option to save the plan.

A Savings Deposit script is updated at 1118. If the user has preset goals at step 1114, then those goals are fed to the Savings Processing system at 1116. Once the savings deposit script is updated at step 1118 then the savings amount is deposited into savings bank account or wallet at step 1120, a deductions file updated at 1122, and the workflow ends at step 1140. If the user already has bank accounts linked to their account, a list of those bank accounts is displayed; if no bank account is linked then the option of adding one or more bank accounts is provided to the user. Background authorizations and verification may be made of the accounts selected. For example, for bank accounts, a penny test may be performed. Only when all verifications are completed is a savings plan considered set-up and ready for use. Additional options may also be displayed to the user, which could include peer-to-peer lending, and other investment products. In some cases, the goals could be tied to services and products from vendors who may offer special prices and discounts. Vendors may include travel providers, retailers, and other merchants, who may offer a goal driven savings plan.

In at least some embodiments, the system can provide members with a financial institution-issued savings account if a member does not have one. This method of savings allows employees to save irrespective of whether they have a DDA (direct deposit account) with or without direct deposit. In at least some such embodiments:

Employees may have the option to allocate a value towards their savings account from their net pay through the third party's platform. The third party can capitalize on the payroll integration that already exists with the employer to facilitate deductions for employee funds access. Employees can choose the amount and frequency of deduction towards their savings account from their account. The third party can process the deduction and settle the amount into employee's savings account. This method of savings does not allow the employee to receive their pay and then make a determination to save. Savings are a deduction directly from employee's net pay and deposited directly into employee's savings account.

Employers can use third parties' systems to incentivize employees by depositing funds directly into employees' savings accounts.

The third party can structure the repayments with additional deduction (configurable) option to facilitate savings. Amounts from the additional deductions are deposited into employee's savings account. For example, if an employee takes an advance for $300 with 2 deductions. Total amount outstanding will be $310 ($300 in principal+$10 in fees) with 2 deductions for $155 each. To encourage savings, the third party can provide employees the option for additional deductions (configurable) and an amount of employee choosing (configurable). Any amount deducted over $310 will be deposited into employee's savings account by the third party.

The third party can deposit the redeemable value of loyalty earned by its members into their savings account. The third party can match and increase the loyalty generated value (configurable) if deposited into a savings account.

The third party can pay a higher interest rate than market (configurable) for amounts deposited into savings account.

The Savings Deposit system is able to take money out from an individual's account just before deduction processing date and deposit that in the necessary bank or savings accounts as per the created savings plan. The saved amount may appear as a separate entry in a deductions file that is submitted to the employer in the event that the savings source is earned but unpaid earnings.

Therefore, although the present disclosure describes particular embodiments of systems and methods, it should be understood that the present disclosure is not intended to be limited to the specific concepts or features described above. Rather, the methods, systems, and devices discussed above are intended merely to be examples. Further, it should be appreciated that the various embodiments encompassed herein can omit, substitute, or add various procedures or components as appropriate relative to the particular embodiments described above. For example, it should be appreciated that the methods described above (e.g., in the flow charts of FIGS. 1A through 11) instead in alternate embodiments can be performed in orders different from those described above, and/or that various steps can be added, omitted, or combined. Indeed, the steps or operations described herein can be performed in the sequences given above or in different orders (with the orders of the steps rearranged) as applicable. Further, although some of the processes described above involve operations performed as a sequential process, in other embodiments many of the operations can be performed in parallel or concurrently. Also, a number of steps can be undertaken before, during, or after the above-described process steps are performed. The processes (including subprocesses) and process steps (or substeps) encompassed by the present disclosure can be implemented in any of a variety of manners, can be automated in any of a variety of computers or other machines, and can be coded in software, firmware, or hard coded as machine-readable instructions and/or run through one or more processors that can implement the instructions.

Also, features described herein with respect to certain embodiments can be combined in various other embodiments, and different aspects and elements of the embodiments can be combined in a similar manner. Indeed, various features and aspects of the above-described concepts can be used individually or jointly. Additionally, although certain specific details are given in the description to provide a thorough understanding of the embodiments, it should be understood that the present disclosure also encompasses embodiments that can be practiced without these specific details. The specification and drawings are, accordingly, to be regarded as illustrative rather than restrictive. Further, it should be appreciated that the described systems, components, and devices can merely be components of still larger systems, where other rules can take precedence over or otherwise modify the operations or manners of application described above. Further, it should be appreciated that the concepts encompassed by the present disclosure can be utilized in any number of environments and applications beyond those described herein without departing from the broader spirit and scope of the specification. Additionally, it should be emphasized that technology evolves and, thus, many of the elements are examples and should not be interpreted to limit the scope of the invention.

Therefore, having described several embodiments, it will be recognized by those of skill in the art that various modifications, alternative constructions, and equivalents may be used without departing from the spirit of the invention. It is specifically intended that the present invention not be limited to the embodiments and illustrations contained herein, but include modified forms of those embodiments including portions of the embodiments and combinations of elements of different embodiments as come within the scope of the following claim.

What is claimed is:

1. A method for providing cash access to earned but unpaid income based on a request received from a remote device, the method comprising:
   providing a facade server that is configured to serve an interface tailored to the remote device, and wherein the facade server is coupled to an authentication server;
   receiving, at the authentication server, a login request and device information from the remote device;
   processing the device information to determine a login device type and geolocation of the remote device, wherein the login device type is one selected from: a mobile device, a kiosk, an ATM, and a POS terminal;
   invoking a login procedure based at least in part on an assessed security level of the login device type;
   authenticating a response to the invoked login procedure received from the remote device to indicate one of: a successful login and an unsuccessful login;
   receiving a transaction request, from the remote device, for access to earned but unpaid income, the transaction request comprising a request for cash access, an amount of requested funds and a deduction schedule;
   generating a list of a plurality of cash access points based on the received device information;
   displaying, on a screen at the remote device, of the list of a plurality of cash access points;
   receiving at least one signal from the remote device indicative of acceptance, by a user, of terms and conditions of the transaction request;
   transmitting a code to a registered telephone number associated with the user; and
   dispensing cash corresponding to the amount of requested funds at one of the plurality of cash access points in response to an entry of the code at the respective one of the plurality of cash access points.

2. The method in claim 1, wherein the code is set to expire after a pre-determined time period.

3. The method in claim 1, further comprising receiving a request from the remote device for a resending of the code.

4. The method in claim 3, wherein in response to the request for the resending of the code, transmitting the code from a source number selected using a round-robin technique.

5. The method in claim 1, wherein generating the list of the plurality of cash access points further comprises preparing a combined list of cash access points based on the geolocation of the user, a current time, and a user's past history of cash access to earned but unpaid income.

6. The method in claim 1, wherein the code is an alphanumeric code.

7. The method in claim 1, further comprising receiving, from the remote device, a selection of a cash access point.

8. The method of claim 1, further comprising applying rules from a rules engine wherein the applying rules from a rules engine comprises:
   checking that at least a pre-determined time has elapsed since a last date of payroll; and
   checking that at least a second pre-determined time has elapsed since a previous one of: a deduction file and a deduction record, has been submitted.

9. The method of claim 1, wherein the device information comprises geolocation information, and at least one of: IP address and MAC address.

10. The method of claim 9, wherein the device information comprises geolocation information of the user and an IP address, and wherein indicating a successful login at least comprises:
    determining that the geolocation of the user lies within a predefined geofence; and
    determining that the IP address lies within an allowed range.

11. A system comprising:
    a memory;
    a facade server that is configured to serve an interface tailored to a remote device, and wherein the facade server is coupled to an authentication server; and
    a processing device, coupled to the memory, the processing device configured to cause the processing device to perform operations including:
    receiving, at the authentication server, a login request and device information from the remote device;
    processing the device information to determine a login device type and geolocation of the remote device, wherein the login device type is one selected from: a mobile device, a kiosk, an ATM, and a POS terminal;
    invoking a login procedure based at least in part on an assessed security level of the login device type;
    authenticating a response to the invoked login procedure received from the remote device to indicate one of: a successful login and an unsuccessful login;

receiving a transaction request, from the remote device, for access to earned but unpaid income, the transaction request comprising a request for cash access, an amount of requested funds and a deduction schedule;

generating a list of a plurality of cash access points based on the received device information;

displaying, on a screen at the remote device, of the list of a plurality of cash access points;

receiving at least one signal from the remote device indicative of acceptance, by a user, of terms and conditions of the transaction request;

transmitting a code to a registered telephone number associated with the user; and dispensing cash corresponding to the amount of requested funds at one of the plurality of cash access points in response to an entry of the code at the respective one of the plurality of cash access points.

12. The system of claim 11, wherein the operations further include receiving a request from the remote device for a resending of the code.

13. The system of claim 12, wherein the operations further include in response to the request for the resending of the code, transmitting the code from a source number selected using a round-robin technique.

14. The system of claim 11, wherein the device information comprises geolocation information, and at least one of: IP address and MAC address.

15. The system of claim 14, wherein the device information comprises geolocation information of the user and an IP address, and wherein indicating a successful login at least comprises:

determining that the geolocation of the user lies within a predefined geofence; and determining that the IP address lies within an allowed range.

16. The system of claim 11, wherein the code is an alphanumeric code.

17. A non-transitory computer-readable medium comprising instructions that, responsive to execution by a processing device, cause the processing device to perform operations comprising:

providing a facade server that is configured to serve an interface tailored to a remote device, and wherein the facade server is coupled to an authentication server;

receiving, at the authentication server, a login request and device information from the remote device;

processing the device information to determine a login device type and geolocation of the remote device, wherein the login device type is one selected from: a mobile device, a kiosk, an ATM, and a POS terminal;

invoking a login procedure based at least in part on an assessed security level of the login device type;

authenticating a response to the invoked login procedure received from the remote device to indicate one of: a successful login and an unsuccessful login;

receiving a transaction request, from the remote device, for access to earned but unpaid income, the transaction request comprising a request for cash access, an amount of requested funds and a deduction schedule;

generating a list of a plurality of cash access points based on the received device information;

displaying, on a screen at the remote device, of the list of a plurality of cash access points;

receiving at least one signal from the remote device indicative of acceptance, by a user, of terms and conditions of the transaction request;

transmitting a code to a registered telephone number associated with the user; and dispensing cash corresponding to the amount of requested funds at one of the plurality of cash access points in response to an entry of the code at the respective one of the plurality of cash access points.

18. The non-transitory computer-readable medium of claim 17, wherein the operations further comprise applying rules from a rules engine wherein the applying rules from a rules engine comprises:

checking that at least a pre-determined time has elapsed since a last date of payroll; and checking that at least a second pre-determined time has elapsed since a previous one of: a deduction file and a deduction record, has been submitted.

19. The non-transitory computer-readable medium of claim 17, wherein the operations further comprise receiving, from the remote device, a selection of a cash access point.

20. The non-transitory computer-readable medium of claim 17, wherein the code is set to expire after a pre-determined time period.

* * * * *